US008604420B2

(12) United States Patent
Kou

(10) Patent No.: US 8,604,420 B2
(45) Date of Patent: Dec. 10, 2013

(54) MASS SPECTROMETER HAVING ION STORAGE WITH TIMED PULSE OUTPUT

(75) Inventor: Junkei Kou, Akishima (JP)

(73) Assignee: JEOL Ltd., Tokyo (JP)

(*) Notice: Subject to any disclaimer, the term of this patent is extended or adjusted under 35 U.S.C. 154(b) by 27 days.

(21) Appl. No.: 13/115,372

(22) Filed: May 25, 2011

(65) Prior Publication Data

US 2011/0291003 A1 Dec. 1, 2011

(30) Foreign Application Priority Data

May 25, 2010 (JP) ................................ 2010-119169

(51) Int. Cl.
*B01D 59/44* (2006.01)

(52) U.S. Cl.
USPC ............................ 250/282; 250/281; 250/292

(58) Field of Classification Search
USPC .......... 250/281, 282, 283, 284, 287, 290, 292
See application file for complete search history.

(56) References Cited

U.S. PATENT DOCUMENTS

| | | | | |
|---|---|---|---|---|
| 4,963,736 A | 10/1990 | Douglas et al. | |
| 5,248,875 A | 9/1993 | Douglas et al. | |
| 6,020,586 A * | 2/2000 | Dresch et al. | 250/287 |
| 6,107,623 A * | 8/2000 | Bateman et al. | 250/282 |
| 6,111,250 A | 8/2000 | Thomson et al. | |
| 7,564,025 B2 * | 7/2009 | Crawford | 250/282 |
| 2003/0057370 A1 * | 3/2003 | Youngquist et al. | 250/287 |
| 2003/0089846 A1 * | 5/2003 | Cooks et al. | 250/281 |
| 2005/0253061 A1 * | 11/2005 | Cameron et al. | 250/287 |
| 2006/0261266 A1 * | 11/2006 | McCauley | 250/287 |
| 2007/0029473 A1 * | 2/2007 | Verentchikov | 250/281 |
| 2008/0042055 A1 * | 2/2008 | Baykut et al. | 250/287 |
| 2008/0111068 A1 * | 5/2008 | Zabrouskov | 250/282 |
| 2008/0203287 A1 * | 8/2008 | Crawford | 250/282 |
| 2009/0159792 A1 * | 6/2009 | Day et al. | 250/282 |
| 2009/0266983 A1 * | 10/2009 | Yamamoto et al. | 250/287 |
| 2010/0006753 A1 * | 1/2010 | Schroeder | 250/288 |
| 2010/0059673 A1 * | 3/2010 | Makarov et al. | 250/283 |
| 2012/0032074 A1 * | 2/2012 | Kenny | 250/283 |

* cited by examiner

*Primary Examiner* — Robert Kim
*Assistant Examiner* — Jason McCormack
(74) *Attorney, Agent, or Firm* — The Webb Law Firm

(57) ABSTRACT

A spectrometer is offered which can reduce ion loss compared with the prior art even when ions selected by the mass analyzer are modified. The spectrometer includes an ion source for ionizing a sample, an ion storage portion for repeatedly performing a storing operation for storing ions created by the ion source and an expelling operation for expelling the stored ions as pulsed ions, the mass analyzer for passing pulsed ions expelled from the ion storage portion and selecting desired ions according to their mass-to-charge ratio, a detector for detecting pulsed ions passed through the mass analyzer and outputting an analog signal responsive to the intensity of the detection, and a controller for maintaining constant the mass-to-charge ratio of the desired ions selected by the mass analyzer while pulsed ions including the desired ions are passing through the mass analyzer.

19 Claims, 14 Drawing Sheets

MASS SPECTROMETER HAVING ION STORAGE WITH TIMED PULSE OUTPUT

BACKGROUND OF THE INVENTION

1. Field of the Invention

The present invention relates to a mass spectrometer.

2. Description of Related Art

A quadrupole mass spectrometer is a mass spectrometer for detecting the intensities of ions of desired mass-to-charge ratios by applying an RF voltage and a DC voltage to a hyperbolic quadrupole mass filter (QMF) and passing only the ions of the desired mass-to-charge ratios. There are two analysis modes: scan mode in which the desired ion mass-charge-ratio is scanned continuously; and single ion monitoring (SIM) mode in which the mass-to-charge ratio is held constant. In the SIM mode, the accumulation time for one type of ion is long and a high sensitivity is obtained and, therefore, this mode is used in many quantitative measurements. Furthermore, in a triple quadrupole mass spectrometer (TQMS) in which two quadrupole mass filters are connected, the specificity and quantitativeness are improved compared with a single quadrupole mass spectrometer. Therefore, TQMS has been frequently used for structural analysis and quantitative analysis in recent years. See the following prior art: U.S. Pat. Nos. 4,963,736, 5,248,875, and 6,111,250.

In a quadrupole mass spectrometer or a triple quadrupole mass spectrometer, in a case where ions to be selected by the quadrupole mass filter of the mass analyzer are varied, some time is required to modify the RF voltage and DC voltage applied to the quadrupole mass filter. In the conventional quadrupole mass spectrometer or triple quadrupole mass spectrometer, ions generated by the ion source are continuously transported to the detector and so ions pass into the mass analyzer while the voltages are being modified. However, these ions cannot reach the detector or, if they reach the detector, the mass-to-charge ratios cannot be identified and thus the detector output signal is discarded. This presents the problem that ion loss occurs.

SUMMARY OF THE INVENTION

In view of the foregoing problems, the present invention has been made. Some aspects of the invention can provide a mass spectrometer capable of reducing ion loss compared with the prior art instrument even when the ion species selected by the mass analyzer are modified.

(1) The present invention provides a mass spectrometer comprising: an ion source for ionizing a sample; an ion storage portion for repeatedly performing a storing operation for storing ions generated by the ion source and expelling the stored ions as pulsed ions; a mass analyzer for passing the pulsed ions expelled by the ion storage portion and selecting desired ions according to their mass-to-charge ratio; a detector for detecting the pulsed ions passed through the mass analyzer and outputting an analog signal responsive to the intensity of the detection; and a controller for maintaining constant the mass-to-charge ratio of the desired ions selected by the mass analyzer while pulsed ions including the desired ions are passing through the mass analyzer.

In the mass spectrometer of the present invention, the mass-to-charge ratio of ions selected by the mass analyzer is kept constant while pulsed ions are passing through the mass analyzer. Therefore, when pulsed ions are passing through the mass analyzer, the mass-to-charge ratio of ions selected by the mass analyzer is not varied. Consequently, it is assured that the ions selected by the mass analyzer pass through the mass analyzer.

Furthermore, in the mass spectrometer of the present invention, ions are stored by the ion storage portion and expelled as pulsed ions. Consequently, it is possible to create a time in which ions are not passed into the mass analyzer. Hence, the ions selected by the mass analyzer can be modified during this time interval in which ions are not allowed to enter the mass analyzer.

Accordingly, the present invention makes it possible to reduce ion loss even when the ions selected by the mass analyzer are modified.

(2) In this mass spectrometer, the ion storage portion may repeatedly perform the storing operation and the expelling operation at their respective regular intervals.

In this operation, the ion storage time and expelling time of the ion storage portion are kept constant. The intensities of ions can be compared by modifying the ions selected by the mass analyzer whenever the ion storage portion performs the expelling operation.

(3) This mass spectrometer may further include: an analog to digital (A/D) converter for sampling the analog signal outputted from the detector and converting it into a digital signal; a data processing portion for accumulating or averaging the digital signal outputted from the A/D converter; and a data storage portion for storing output data produced from the data processing portion. The data processing portion may perform the accumulating or averaging operation for each mass-to-charge ratio of the desired ions. Data derived by the accumulation or averaging are correlated with information about the mass-to-charge ratio of the desired ions and stored in the data storage portion.

By accumulating or averaging the digital output signal from the A/D converter in this way, more accurate data about ion intensities can be obtained for each mass-to-charge ratio of ions while canceling random noise components superimposed on the digital signal.

(4) In this mass spectrometer, the A/D converter may start to sample the analog signal before each of pulsed ions passed through the mass analyzer impinges on the detector and terminate the sampling of the analog signal after completion of the impingement on the detector.

By performing the sampling by the A/D converter while pulsed ions are being entered into the detector in this way, acceptance of unwanted noise is prevented. As a consequence, the detection sensitivity can be enhanced.

(5) In this mass spectrometer, the A/D converter may begin to sample the analog signal after a given delay time since the storage portion started to perform the expelling operation for expelling each of pulsed ions of the same ion species selected by the mass analyzer.

(6) In this mass spectrometer, the A/D converter may sample the analog signal for a given time after a given delay time since the ion storage portion started to perform the expelling operation for causing each of pulsed ions of the same ion species selected by the mass analyzer to be expelled for a given time.

(7) In this mass spectrometer, the mass analyzer may include a quadrupole mass filter for selecting the desired ions.

(8) The present invention also provides a mass spectrometer comprising: an ion source for ionizing a sample; an ion storage portion for repeatedly performing a storing operation for storing ions generated by the ion source and for expelling the stored ions as pulsed ions; a first mass analyzer for passing the pulsed ions expelled by the ion storage portion and selecting first ions according to their mass-to-charge ratio; a collision cell for fragmenting all or some of pulsed ions passed through the first mass analyzer to produce product ions and expelling pulsed ions including the product ions; a second mass analyzer for passing the pulsed ions expelled by the collision cell and selecting second ions according to their mass-to-charge ratio; a detector for detecting the pulsed ions passed through the second mass analyzer and outputting an analog signal responsive to the intensity of the detection; and a controller. When pulsed ions including the first ions are passing through the first mass analyzer, the controller maintains constant the mass-to-charge ratio of the first ions selected by the first mass analyzer. When pulsed ions including the second ions are passing through the second mass analyzer, the controller maintains constant the mass-to-charge ratio of the second ions selected by the second mass analyzer.

In the present invention, when pulsed ions are passing through the first mass analyzer, the mass-to-charge ratio of the first ions selected by the first mass analyzer is kept constant. Therefore, it is unlikely that the mass-to-charge ratio of the first ions selected by the first mass analyzer will be changed while pulsed ions are passing through the first mass analyzer. This assures that ions to be selected by the first mass analyzer pass through the first mass analyzer.

Similarly, when pulsed ions are passing through the second mass analyzer, the mass-to-charge ratio of the second ions selected by the second mass analyzer is kept constant. Therefore, it is unlikely that the mass-to-charge ratio of the second ions selected by the second mass analyzer will be changed while pulsed ions are passing through the second mass analyzer. Hence, ions to be selected by the second mass analyzer can always pass through the second mass analyzer.

Furthermore, in the present invention, ions are stored in the storage portion and expelled as pulsed ions. A time in which ions do not enter the second mass analyzer can be created, as well as a time in which ions do not enter the first mass analyzer. Therefore, ions selected by the first mass analyzer can be changed during the time in which ions do not enter the first mass analyzer. In addition, the ions selected by the second mass analyzer can be changed during the time in which ions do not enter the second mass analyzer.

Therefore, according to the present invention, ion loss can be reduced in cases where ions selected by at least one of the first and second mass analyzers are changed.

9) In this mass spectrometer, the ion storage portion may repeatedly perform the storing operation and the expelling operation at their respective regular intervals.

Thus, the time in which ions are stored in the storage portion and the time in which ions are expelled from the storage portion are kept constant. The intensities of ions in transitions (pairs of m/z values selected respectively by the first and second mass analyzers) can be compared by varying the transitions whenever an expelling operation from the ion storage portion is performed.

(10) In this mass spectrometer, the collision cell may repeatedly perform the storing operation for storing the first ions and the product ions and the expelling operation for expelling pulsed ions including the stored product ions.

The time in which ions do not enter the second mass analyzer can be easily controlled by storing ions in the storage portion and expelling the ions as pulsed ions. This makes it easy to change the ions selected by the second mass analyzer during the time in which ions are not allowed to enter the second mass analyzer.

The width of the pulsed ions entering the detector can be made narrower than the width of the pulsed ions entering the collision cell by storing ions in the collision cell and expelling pulsed ions and so the detection sensitivity can be prevented from deteriorating.

(11) In this mass spectrometer, the ion storage portion may repeatedly perform the storing operation and the expelling operation at their respective regular intervals. The collision cell may repeatedly perform the storing operation and the expelling operation at their respective regular intervals.

Consequently, the time in which ions are stored in the ion storage portion and the time in which ions are expelled from the storage portion are kept constant. Also, the time in which ions are stored in the collision cell and the time in which ions are expelled from the collision cell are kept constant. The intensities of ions in different transitions can be compared by varying the transition (pair of m/z values of ions respectively selected by the first and second mass analyzers) whenever the expelling operation from the storage portion or from the collision cell is performed.

(12) In this mass spectrometer, the collision cell may perform the storing operation while the pulsed ions passed through the first mass analyzer impinge on the collision cell.

Thus, ions entering the collision cell are once stored in the collision cell and, therefore, the fragmentation efficiency at the collision cell can be enhanced.

(13) In this mass spectrometer, in a case where the mass-to-charge ratio of the first ions selected by the first mass analyzer is modified, the collision cell may expel all of the second ions present in the collision cell by an expelling operation for expelling a pulsed ion occurring finally prior to the modification.

All the second ions staying in the collision cell can be expelled by lengthening the expelling time in which the pulsed ions occurring finally prior to modification of the mass-to-charge ratio of the first ions are expelled. Consequently, the crosstalk between different transitions (pairs of m/z values of ions respectively selected by the first and second mass analyzers) can be reduced.

(14) This mass spectrometer may further include an A/D converter for sampling the analog output signal from the detector and converting the signal into a digital signal, a data processing portion for accumulating or averaging the digital output signal from the A/D converter, and a data storage portion for storing the output data produced from the data processing portion. The data processing portion may perform the accumulating or averaging operation for each transition (pair of the mass-to-charge ratio of the first ions and the mass-to-charge ratio of the second ions). Data about the results of the accumulation or averaging may be correlated with information about pairs of the mass-to-charge ratios of the first and second ions and stored in the data storage portion.

Thus, random noise components superimposed on the digital signal are canceled out by accumulating or averaging the digital output signal from the A/D converter. Consequently, more accurate data about ion intensities can be obtained for each transition.

(15) In this mass spectrometer, the A/D converter may start to sample the analog signal for each of pulsed ions passed through the second mass analyzer before the ions begin to impinge on the detector and end the sampling of the analog signal after the end of the impingement on the detector.

The sampling is performed by the A/D converter only while pulsed ions are entering the detector. This prevents unwanted noise from being accepted. In consequence, the detection sensitivity can be enhanced.

(16) In this mass spectrometer, in a case where pulsed ions are expelled from the collision cell, the A/D converter may begin to sample the analog signal after a given delay time since the collision cell started to perform the expelling operation for expelling each of pulsed ions of the same ion species selected by the second mass analyzer.

(17) In this mass spectrometer, in a case where pulsed ions are expelled from the collision cell, the A/D converter may sample the analog signal for a given time after a given delay time since the collision cell started to perform the expelling operation for expelling each of pulsed ions of the same ion species selected by the second mass analyzer.

(18) In this mass spectrometer, in a case where pulsed ions are expelled only from the ion storage portion, the A/D converter may begin to sample the analog signal after a given delay time since the ion storage portion started the expelling operation for expelling each of pulsed ions in the same transition (pair of m/z values).

(19) In this mass spectrometer, in a case where pulsed ions are expelled only from the ion storage portion, the A/D converter may sample the analog signal for a given time after a given delay time since the ion storage portion started the expelling operation for expelling each of pulsed ions in the same transition (pair of m/z values).

(20) In this mass spectrometer, the first mass analyzer may include a quadrupole mass filter for selecting the first ions. The second mass analyzer may include a quadrupole mass filter for selecting the second ions.

Other features and advantages of the present invention will become apparent from the following more detailed description, taken in conjunction with the accompanying drawings, which illustrate, by way of example, the principles of the invention.

DESCRIPTION OF THE PREFERRED EMBODIMENTS

The preferred embodiments of the present invention are hereinafter described in detail with reference to the drawings. It is to be understood that the embodiments described below do not unduly restrict the contents of the present invention and that all the configurations described below are not always essential constituent components of the invention.

In the following description, a quadrupole mass spectrometer for separating ions by the use of a quadrupole mass filter is taken as an example. The invention can also be applied to magnetic mass spectrometers (such as single-focusing magnetic sector type and double-focusing magnetic sector type) for separating ions by utilizing the nature that the orbit of ions is varied according to their mass-to-charge ratio within a magnetic field.

1. First Embodiment

(1) Configuration

The configuration of a mass spectrometer according to the first embodiment is first described. This instrument is a so-called stand-alone quadrupole mass spectrometer. One example of the configuration is shown in FIG. 1, which is a schematic cross section of the spectrometer taken vertically.

Figure 1:
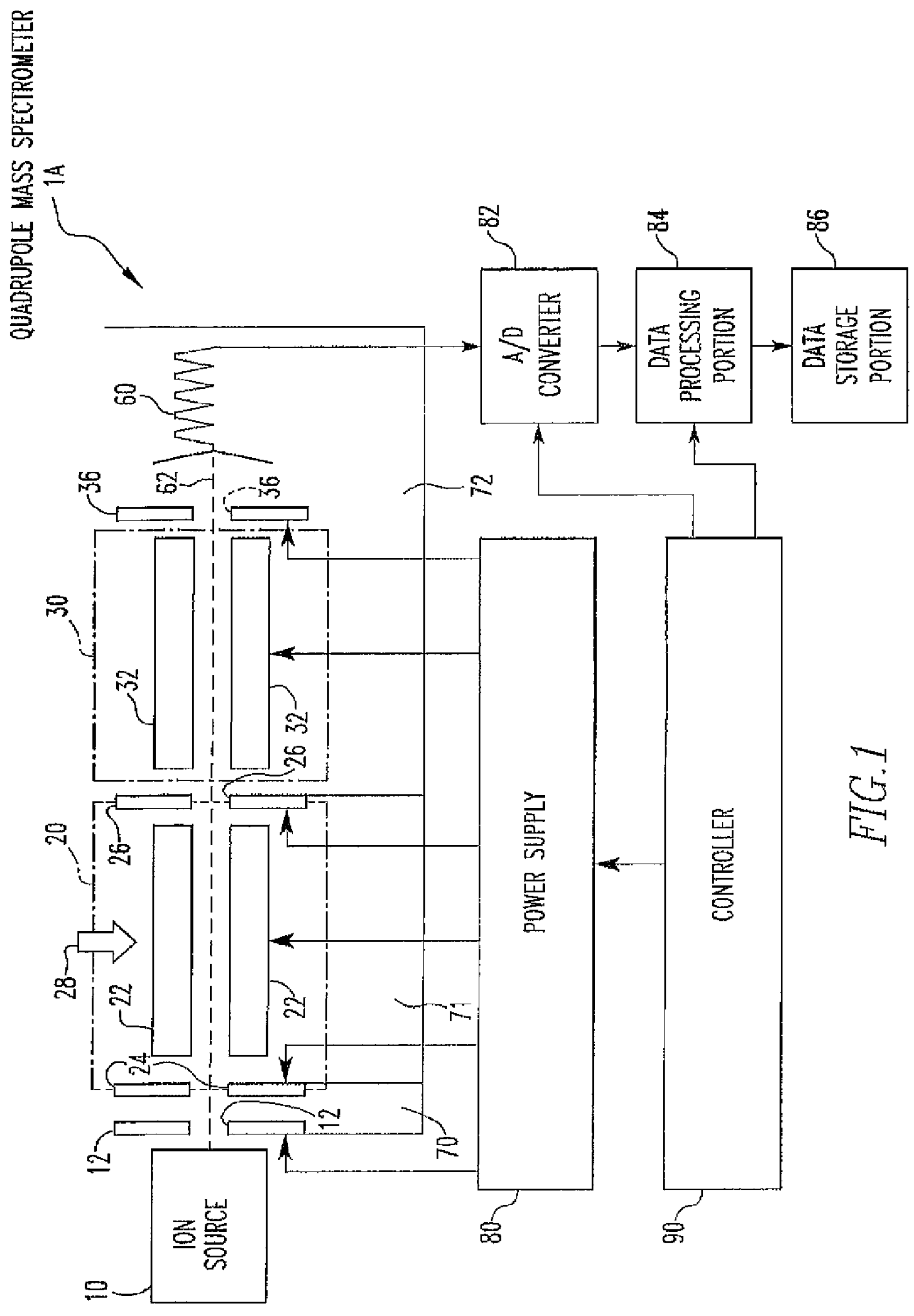
FIG. 1 is a block diagram of a mass spectrometer according to a first embodiment of the present invention.

As shown in FIG. 1, the quadrupole mass spectrometer according to the first embodiment of the present invention is generally indicated by reference numeral 1A and configured including an ion source 10, an ion storage portion 20, a mass analyzer 30, a detector 60, a power supply 80, an A/D converter 82, a data processing portion 84, a data storage portion 86, and a controller 90. The quadrupole mass spectrometer of the present embodiment may be configured such that some of the constitutive elements of FIG. 1 are omitted.

The ion source 10 ionizes a sample introduced from a sample introduction device such as a chromatograph (not shown) by a given method. The ion source 10 can be realized as an atmospheric-pressure continuous ion source for continuously creating ions by an atmospheric-pressure ionization method such as ESI.

One or more electrodes 12 centrally provided with an aperture are mounted behind the ion source 10. The ion storage portion 20 is mounted behind the electrodes 12.

The ion storage portion 20 includes an ion guide 22. An entrance electrode 24 and an exit electrode 26 are disposed on the opposite sides of the ion guide 22. Furthermore, the storage portion 20 is equipped with a gas introduction device 28 (such as a needle valve) for introducing gas from the outside. The ion guide 22 is made of a multipole such as a quadrupole or a hexapole. Each of the entrance electrode 24 and exit electrode 26 is centrally provided with an aperture. The ion storage portion 20 repeatedly performs a storing operation for storing ions created by the ion source 10 and an expelling operation for expelling the stored ions as pulsed ions.

The mass analyzer 30 including a quadrupole mass filter 32 is mounted behind the ion storage portion 20. The mass analyzer 30 selects desired ions from the pulsed ions expelled from the ion storage portion 20 according to their mass-to-charge ratio (m/z) (where m is the mass of an ion and z is the valence of the ion) and passes pulsed ions including the desired (selected) ions. In particular, the mass analyzer 30 selects and passes ions having mass-to-charge ratios according to select voltages (an RF voltage and a DC voltage) applied to the quadrupole mass filter 32.

Another electrode 36 centrally provided with an aperture is mounted behind the mass analyzer 30. The detector 60 is mounted behind the electrode 36. The detector 60 detects the pulsed ions passed through the mass analyzer 30 and outputs an analog signal responsive to the detection intensity.

A space between the electrodes 12 and the entrance electrode 24 of the ion storage portion 20 forms a first differential pumping chamber 70. A space between the entrance electrode 24 and the exit electrode 26 of the ion storage portion 20 forms a second differential pumping chamber 71. A space located behind the exit electrode 26 of the ion storage portion 20 forms a third differential pumping chamber 72.

The analog output signal from the detector 60 is applied to the A/D converter 82, where the signal is converted into a digital signal. The digital signal from the A/D converter 82 is applied to the data processing portion 84, which performs an accumulating operation (adding up plural digital signals) or averaging operation (adding up digital signals and dividing the sum by the number of the digital signals). The intensities of the selected ions are calculated. The ion intensities are correlated with identification information about the selected ions and stored in the data storage portion 86.

The power supply 80 applies desired voltages to the electrodes 12, 24, 26, 36, ion guide 22, and quadrupole mass filter 32 independently or interlockingly so that ions travel from the ion source 10 to the detector 60 along the optical axis 62. In particular, the power supply 80 applies desired voltages to the electrodes 12 and 24 to permit the ions created by the ion source 10 to reach the ion storage portion 20. The power supply 80 applies desired voltages to the electrode 24, ion guide 22, and electrode 26 such that the ion storage portion 20 repeatedly performs the operations for storing and expelling ions. Furthermore, the power supply 80 applies desired voltages to the electrode 26, quadrupole mass filter 32, and electrode 36 such that the mass analyzer 30 selects desired ions and that the selected ions reach the detector 60. The path (optical axis 62) along which ions are transported does not need to be a straight line as shown in FIG. 1. The path may be curved or bent to remove background ions.

The controller 90 controls the timing at which the voltages applied by the power supply 80 is switched, as well as the timings of operation of the A/D converter 82 and data processing portion 84. Especially, the controller 90 maintains constant the mass-to-charge ratio of desired ions selected by the mass analyzer 30 while pulsed ions including the desired ions selected by the mass analyzer 30 are passing through the mass analyzer 30.

(2) Operation

The operation of the quadrupole mass spectrometer 1A of the first embodiment is next described. In the following description, it is assumed that ions created by the ion source 10 are positive ions. The created ions may also be negative ions, in which case the following principle can be applied if the voltage polarity is inverted.

Ions generated by the ion source 10 pass through the apertures in the electrodes 12 and enter the ion storage portion 20 from the entrance electrode 24 through the first differential pumping chamber 70.

Ions are once stored in the ion storage portion 20 and then expelled from it. For this purpose, a pulsed voltage is applied to the exit electrode 26 of the ion storage portion 20 from the power supply 80. When the pulsed voltage applied to the exit electrode 26 is made higher than the axial voltage across the ion guide 22, the exit electrode 26 is closed. Under this condition, the ions are stored in the ion storage portion 20. On the other hand, when the pulsed voltage impressed on the exit electrode 26 is made lower than the axial voltage across the ion guide 22, the exit electrode 26 is opened. Under this condition, ions are expelled from the ion storage portion 20.

Since the ion source 10 is at atmospheric pressure, a large amount of air flows into the ion storage portion 20 through the aperture in the entrance electrode 24. The kinetic energy of the ions present in the storage portion 20 is reduced by collision with air flowed in. The energy of ions returning to the entrance electrode 24 after being bounced back to the potential barrier at the exit electrode 26 during ion storage becomes lower than the energy when they first pass across the entrance electrode 24. Therefore, it is possible to pass ions from the upstream side and to block ions returning from the downstream side by adjusting the voltage on the entrance electrode 24. Consequently, the storage efficiency of the ion storage portion 20 can be maintained almost at 100%.

Because the ions stored in the ion storage portion 20 decrease in kinetic energy due to collision with air, the total energy of the ions as they are expelled from the storage portion 20 becomes substantially equal to the potential energy due to the axial voltage across the ion guide 22. Where the amount of air entering from the entrance electrode 24 is insufficient and thus the decrease in the kinetic energy of the ions is insufficient, the storage efficiency is improved by introducing gas from the gas introduction means 28.

The select voltages (RF voltage and DC voltage) for selecting ions according to their mass-to-charge ratio are supplied to the quadrupole mass filter 32 of the mass analyzer 30 from the power supply 80 to thereby set a desired axial voltage. Ions selected according to the select voltages remain on the optical axis 62 and enter the detector 60.

The analog output signal from the detector 60 is sampled and converted into a digital signal by the A/D converter 82. The digital signal is accumulated or averaged by the data processing portion 84 and the intensities of individual selected ions are computed. The ion intensities are stored in the data storage portion 86 together with identification information about the ions selected at that time.

In the present embodiment, ions are stored in and expelled from the ion storage portion 20. Pulsed ions travel through components located behind the exit electrode 26 of the storage portion 20. The time width of the pulsed ions is substantially the same as the time in which the exit electrode 26 of the storage portion 20 is opened while the pulsed ions are passing through the mass analyzer 30.

In one feature of the present embodiment, ions are prevented from entering the mass analyzer 30 during the time in which the select voltages (RF voltage and DC voltage) applied to the quadrupole mass filter 32 are changed, by storing ions in the storage portion 20. In other words, the mass analyzer 30 selects only one ion species without changing the selected ion species while individual pulsed ions expelled from the storage portion 20 are passing through the mass analyzer 30.

In the present embodiment, the power supply 80, A/D converter 82, and data processing portion 84 are operated from a personal computer (PC) (not shown) in a sequence specified by the user. Therefore, the intensity of a desired selected ion can be measured at a desired time.

Figure 2:
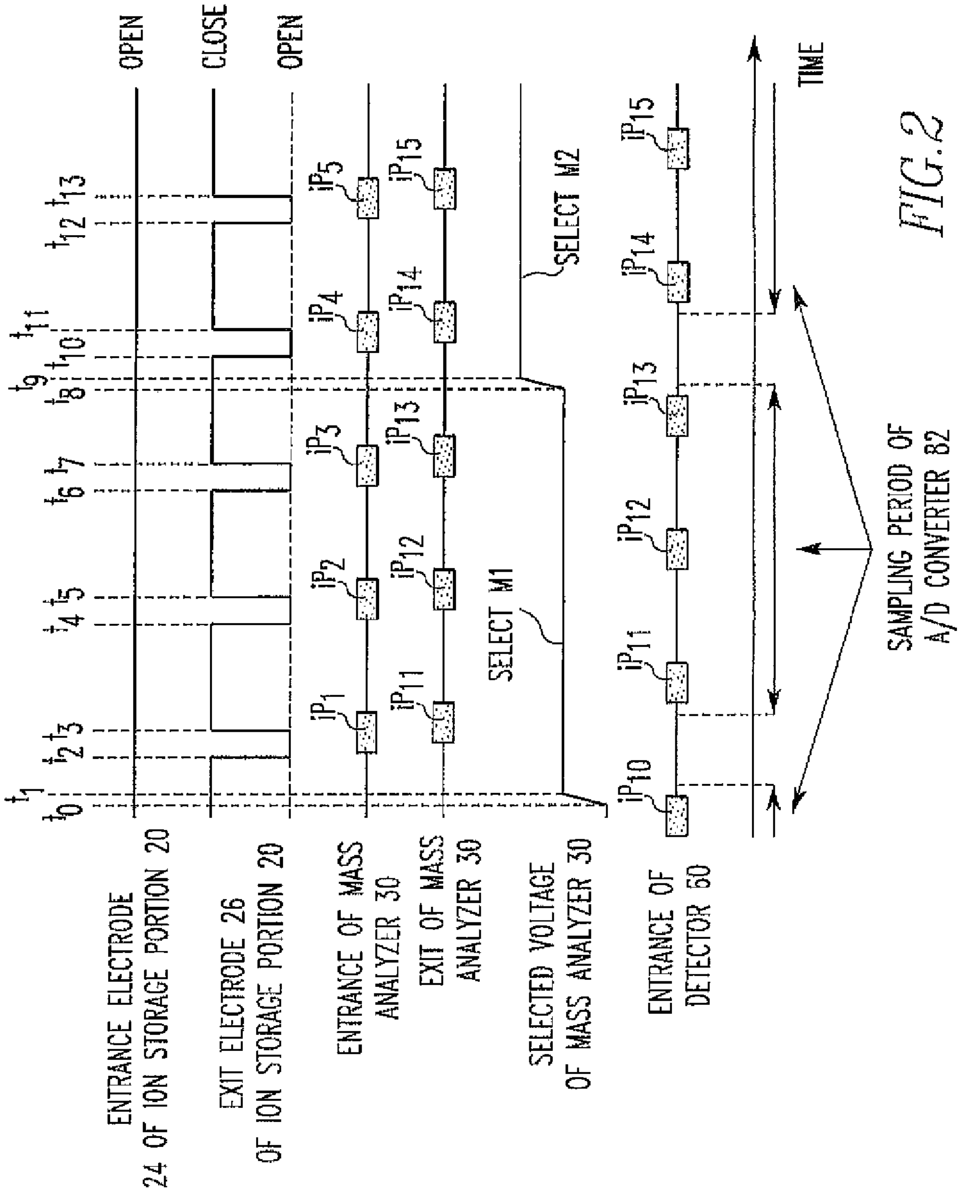
FIG. 2 is a timing chart illustrating one example of a sequence of operations performed by a quadrupole mass spectrometer according to the first embodiment of the invention.

FIG. 2 is a timing chart showing one example of sequence of operations performed by the quadrupole mass spectrometer 1A. As shown in this figure, a constant voltage lower than the voltage on the electrodes 12 is applied to the entrance electrode 12 of the ion storage portion 20. The entrance of the ion storage portion 20 is always open. Therefore, nearly 100% of ions generated in the ion source 10 are entered into the storage portion 20, where they are stored.

Two different voltages are periodically applied to the exit electrode 26 of the ion storage portion 20. When the voltage on the exit electrode 26 is higher than the axial voltage across the ion guide 22, the exit of the storage portion 20 is closed and ions are stored. On the other hand, when the voltage on the exit electrode 26 is lower than the axial voltage across the ion guide 22, the exit of the storage portion 20 is opened and ions are expelled. That is, the storage portion 20 repeatedly and alternately performs the storing operation and the expelling operation because the voltage on the exit electrode 26 of the storage portion 20 is periodically switched.

In particular, ions are stored in the ion storage portion 20 until an instant of time $t_2$. All or some of the ions stored in the storage portion 20 until the instant $t_2$ are expelled as pulsed ions $ip_1$ from the storage portion 20 between instants $t_2$ and $t_3$. All or some of the ions stored in the storage portion 20 until an instant $t_4$ are expelled as pulsed ions $ip_2$ from the storage portion 20 between instants $t_4$ and $t_5$. All or some of the ions stored in the storage portion 20 until an instant $t_6$ are expelled as pulsed ions $ip_3$ from the storage portion 20 between instants $t_6$ and $t_7$. All or some of the ions stored in the storage portion 20 until an instant $t_{10}$ are expelled as pulsed ions $ip_4$ from the storage portion 20 between instants $t_{10}$ and $t_{11}$. All or some of the ions stored in the storage portion 20 until an instant $t_{12}$ are expelled as pulsed ions $ip_5$ from the storage portion 20 between instants $t_{12}$ and $t_{13}$. These pulsed ions $ip_1$ to $ip_5$ successively enter the mass analyzer 30.

In the mass analyzer 30, the select voltages (RF voltage and DC voltage) are switched during the interval from $t_0$ to $t_1$ and during an interval from $t_8$ to $t_9$. During an interval from the instant $t_1$ to $t_8$, ions having a mass-to-charge ratio of M1 are selected. Ions having a mass-to-charge ratio of M2 are selected from the instant $t_9$ on. The change time of from the instant $t_8$ to $t_9$ is taken for the select voltages to stabilize when the selected ion species is switched from ions with m/z of M1 to ions with m/z of M2.

The pulsed ions $ip_1$, $ip_2$, and $ip_3$ become pulsed ions $ip_{11}$, $ip_{12}$, and $ip_{13}$, respectively, having a mass-to-charge ratio of M1 while they are passing through the mass analyzer 30. The pulsed ions $ip_4$ and $ip_5$ become pulsed ions $ip_{14}$ and $ip_{15}$, respectively, having a mass-to-charge ratio of M2 while they are passing through the mass analyzer 30.

In one feature of the present embodiment, in order to prevent ions from entering the mass analyzer 30 during the change time of from the instant $t_8$ to instant $t_9$, the instant $t_8$ is later than the instant when the final pulsed ion $ip_{13}$ out of ions having the mass-to-charge ratio of M1 selected by the mass analyzer 30 finishes passing through the mass analyzer 30. The instant $t_9$ is earlier than the instant when the first pulsed ion $ip_4$ out of ions having the mass-to-charge ratio of M2 selected by the mass analyzer 30 begins to pass through the mass analyzer 30.

The pulsed ions $ip_{11}$ to $ip_{15}$ passed through the mass analyzer 30 impinge on the detector 60. Pulsed ions $ip_{10}$ are pulsed ions which have a mass-to-charge ratio of M0 and which impinged on the detector 60 immediately earlier than the pulsed ion $ip_{11}$. Where ions with in/z of M1 are sampled by the A/D converter 82, the instant at which the sampling is initiated is between the instant when the finally selected pulsed ion $ip_{10}$ out of the ions with m/z of M0 finishes hitting the detector 60 and the instant when the initially selected pulsed ion $ip_{11}$ out of the ions with ink of M1 begins to hit the detector 60. The instant at which the sampling ends is between the instant when the finally selected pulsed ion $ip_{13}$ out of the ions with m/z of M1 finishes hitting the detector 60 and the instant when the initially selected pulsed ion $ip_{14}$ out of the ions with m/z of M2 begin to hit the detector 60.

The data processing portion 84 accumulates or averages all signals digitized by sampling of selected ions. The values obtained by the accumulation or averaging are stored as intensities of selected ions into the data storage portion 86.

In the quadrupole mass spectrometer 1A of the first embodiment described so far, ions can be prevented from hitting the mass analyzer 30 during the time in which ions selected by the mass analyzer 30 are changed by pulsing and expelling ions after they are once stored in the storage portion 20. Consequently, ion loss can be suppressed compared with the conventional quadrupole mass spectrometer where no ion-storing operation is performed.

Furthermore, in the present embodiment, the integrated intensity of each pulsed ion hitting the detector 60 is made the ion intensity of each selected ion by permitting the ion storage portion 20 to eject only one pulsed ion for each selected ion. The ion intensity of each selected ion is proportional to the amount of selected ions produced from the ion source 10 during a given time (i.e., during a given period between aperture and closure) by maintaining constant the opening time and the closure time of the exit electrode 26 of the ion storage portion 20. Consequently, it follows that ions generated at regular intervals from the ion source 10 are observed and so it is possible to compare the intensities of selected ions.

(3) Modifications

First Modification

In the case of the quadrupole mass spectrometer 1A of the first embodiment, it is easy to set the sampling time of the A/D converter 82. However, the sampling is performed even during the time for which no pulsed ion is detected (e.g., during the time between the instant when detection of the pulsed ion $ip_{11}$ ends and the instant when detection of the next pulsed ions $ip_{12}$ is started), in which case noise is accepted rather than ions. This will lead to deterioration of the signal-to-noise ratio (S/N).

In the first modification, this problem is solved by sampling each individual pulsed ion continuously. In the first modification, the sampling is done while at least individual pulsed ions are impinging on the detector 60. Times for which individual pulsed ions are sampled, respectively, are made not to overlap each other.

The configuration of the quadrupole mass spectrometer of the first modification is similar to the configuration shown in FIG. 1 except that the sampling timing of the A/D converter 82 is different and, therefore, its description and illustration are omitted.

Figure 3:
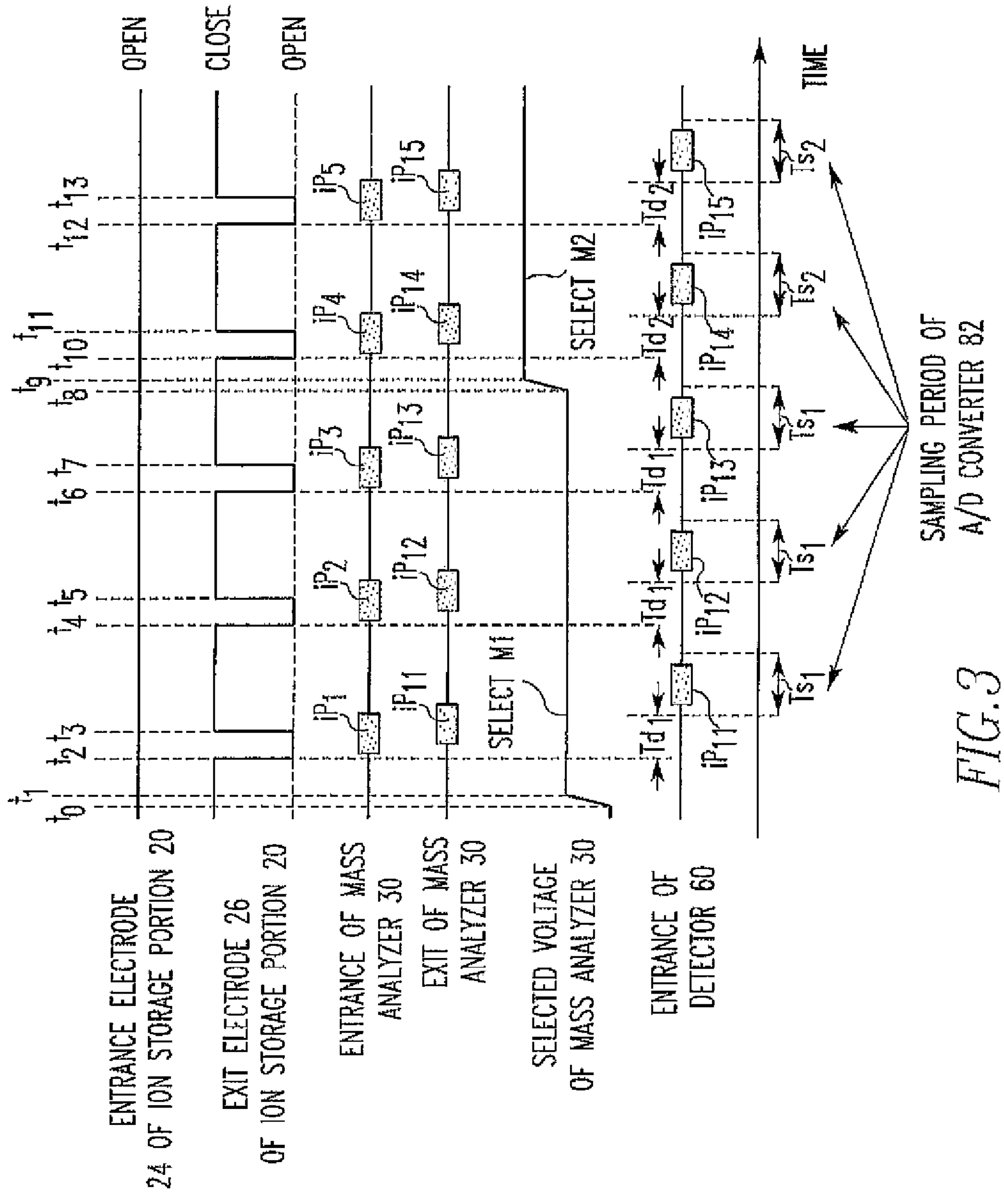
FIG. 3 is a timing chart illustrating one example of a sequence of operations performed by a quadrupole mass spectrometer that is a first modification of the first embodiment.

FIG. 3 is a timing chart illustrating one example of sequence of operations performed by the quadrupole mass spectrometer according to the first modification. In the sequence illustrated in FIG. 3, the processing steps conducted until the pulsed ions $ip_{11}$ to $ip_{15}$ impinge on the detector 60 are the same as their corresponding steps illustrated in FIG. 2 and so their description is omitted.

Where the pulsed ion $ip_{12}$, for example, is sampled by the A/D converter 82, the instant at which the sampling is started is between the instant when sampling of the pulsed ion $ip_{11}$ hitting the detector 60 immediately therebefore ends and the instant at which the pulsed ion $ip_{12}$ begins to hit the detector 60. The instant at which the sampling ends is between the instant at which the pulsed ion $ip_{12}$ finishes hitting the detector 60 and the instant at which sampling of the pulsed ion $ip_{13}$ hitting the detector 60 immediately thereafter is started. Acceptance of unwanted noise is prevented and the detection sensitivity can be enhanced by performing sampling by the A/D converter 82 only during the time for which pulsed ions are hitting the detector. As the time during which sampling is done by the A/D converter 82 agrees more closely with the time during which pulsed ions are detected by the detector 60, the signal-to-noise ratio is improved.

Digital signals produced by sampling the pulsed ions $ip_{11}$, $ip_{12}$, and $ip_{13}$ by the A/D converter 82 are accumulated or averaged by the data processing portion 84. In this way, ion intensities of selected ions of m/z of M1 are obtained and stored in the data storage portion 86.

Where pulsed ions are sampled in this way, the instrument may be so preset that sampling is done only for a given time of operation after a given delay time from the instant when an expelling operation of the ion storage portion 20 was started as shown in FIG. 3. For example, in the case of the pulsed ion $ip_{11}$, sampling is performed for a time of operation $Ts_1$ after a delay of time $Td_1$ from the instant at which an operation for expelling the pulsed ions $ip_1$ on which the pulsed ion $ip_{11}$ is based was started by the ion storage portion 20. Also, with respect to sampling of the other pulsed ions $ip_{12}$, $ip_{13}$, $ip_{14}$, and $ip_{15}$, delay times from the instants $t_4$, $t_6$, $t_{10}$, and $t_{12}$ at which operations for expelling the pulsed ions $ip_2$, $ip_3$, $ip_4$, and $ip_5$ on which those pulsed ions are based from the ion storage portion 20 are set, as well as times of operation for performing the sampling.

Where the time during which the exit electrode 26 of the storage portion 20 is opened is constant, pulsed ions producing the same selected ions are identical in flight velocity and time width and, therefore, these ions can be sampled with the same delay time and same time of operation. For example, where three pulsed ions $ip_{11}$, $ip_{12}$, and $ip_{13}$ are sampled such that ions of m/z of M1 are selected, all the delay times can be set to the same time $Td_1$ and all the times of operation can be set to the same time $Ts_1$ provided that opening times $t_3$-$t_2$, $t_5$-$t_4$, and $t_7$-$t_6$ of the expelling operation for expelling the pulsed ions $ip_1$, $ip_2$, and $ip_3$ (on which those pulsed ions are based) are set to the same time.

When the selected ion is varied, the flight velocity and time width of the pulsed ion expelled from the exit electrode 26 of the ion storage portion 20 are also varied. For example, the delay time $Td_1$ for the pulsed ion $ip_{11}$ enabling selection of ions of m/z of M1 is different from the delay time $Td_2$ for the pulsed ions $ip_{14}$ enabling selection of ions of m/z of M2. Also, their times of operations $Ts_1$ and $Ts_2$ are different from each other. That is, the delay time and the time of operation are varied according to selected ion.

Second Modification

Figure 4:
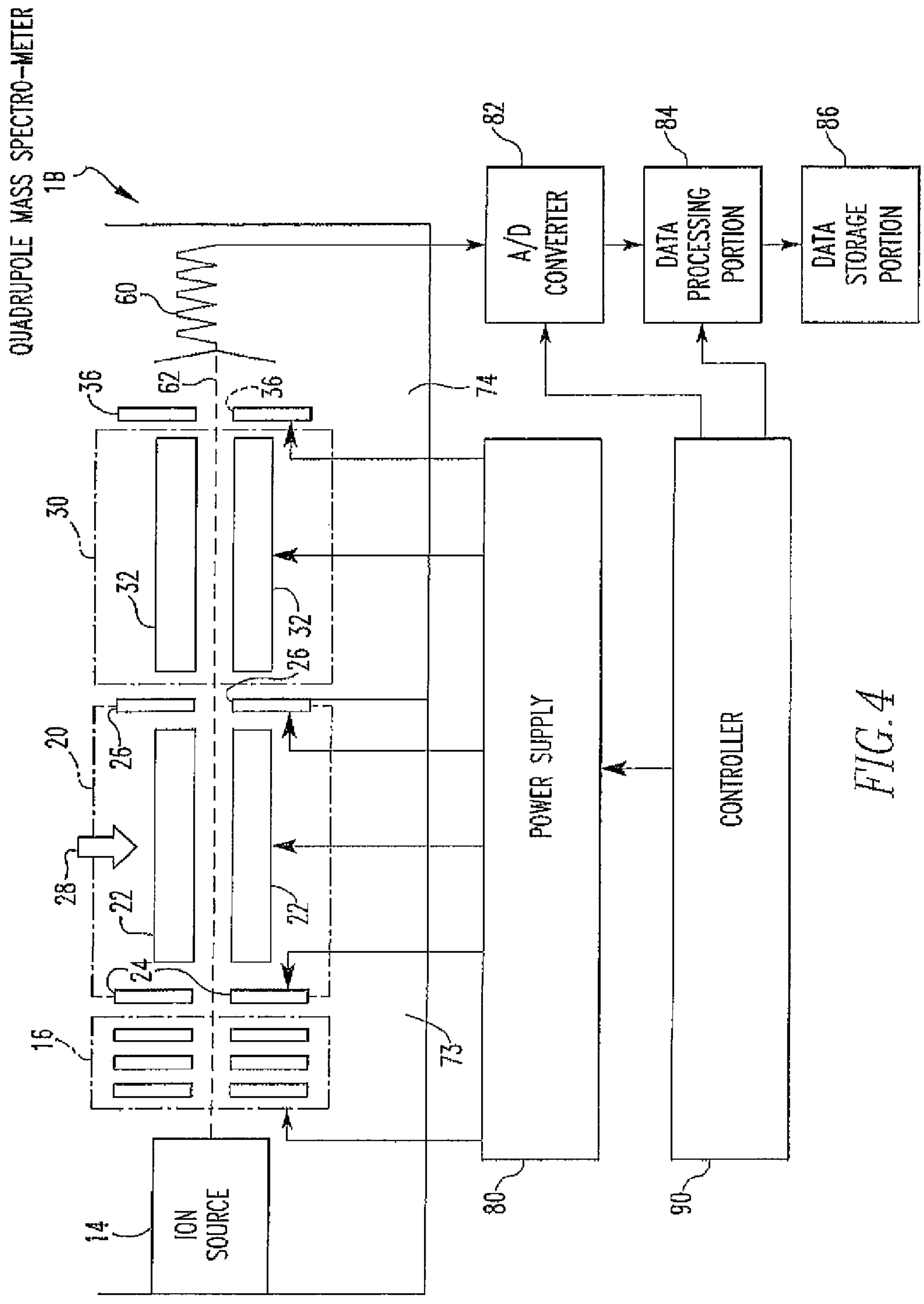
FIG. 4 is a block diagram of a quadrupole mass spectrometer that is a second modification of the first embodiment.

In the first embodiment, the atmospheric-pressure ion source 10 is used. The first embodiment may be so modified that an ion source (such as an EI (electron impact) ion source for ionizing a sample by impacting the sample with electrons) for ionizing a sample within a vacuum may be used. FIG. 4 shows the configuration of the second modification. In both FIGS. 1 and 4, like components are indicated by like reference numerals and their description is omitted.

Referring to FIG. 4, a quadrupole mass spectrometer according to the second modification is generally indicated by reference numeral 1B and differs from the quadrupole mass spectrometer 1A shown in FIG. 1 in that it has an ion source 14 instead of the ion source 10 and that a focusing lens 16 consisting of plural electrodes is mounted between the ion source 14 and the entrance electrode 24 of the ion storage portion 20. Furthermore, the instrumental section extending from the ion source 14 to the exit electrode 26 of the storage portion 20 forms a first differential pumping chamber 73. The space located behind the exit electrode 26 of the storage portion 20 forms a second differential pumping chamber 74.

In the quadrupole mass spectrometer 1B, the ion source 14 is in a vacuum. To enhance the ion storage efficiency of the storage portion 20, gas is introduced from the gas introduction means 28 to lower the kinetic energies of ions. The instrument 1B is similar in other operations to the instrument 1A and so its description is omitted.

2. Second Embodiment

(1) Configuration

The configuration of a mass spectrometer according to a second embodiment of the present invention is described. This spectrometer is a so-called triple quadrupole mass spectrometer. One example of its configuration is shown in FIG. 5, which is a schematic cross section of the spectrometer taken vertically.

Figure 5:
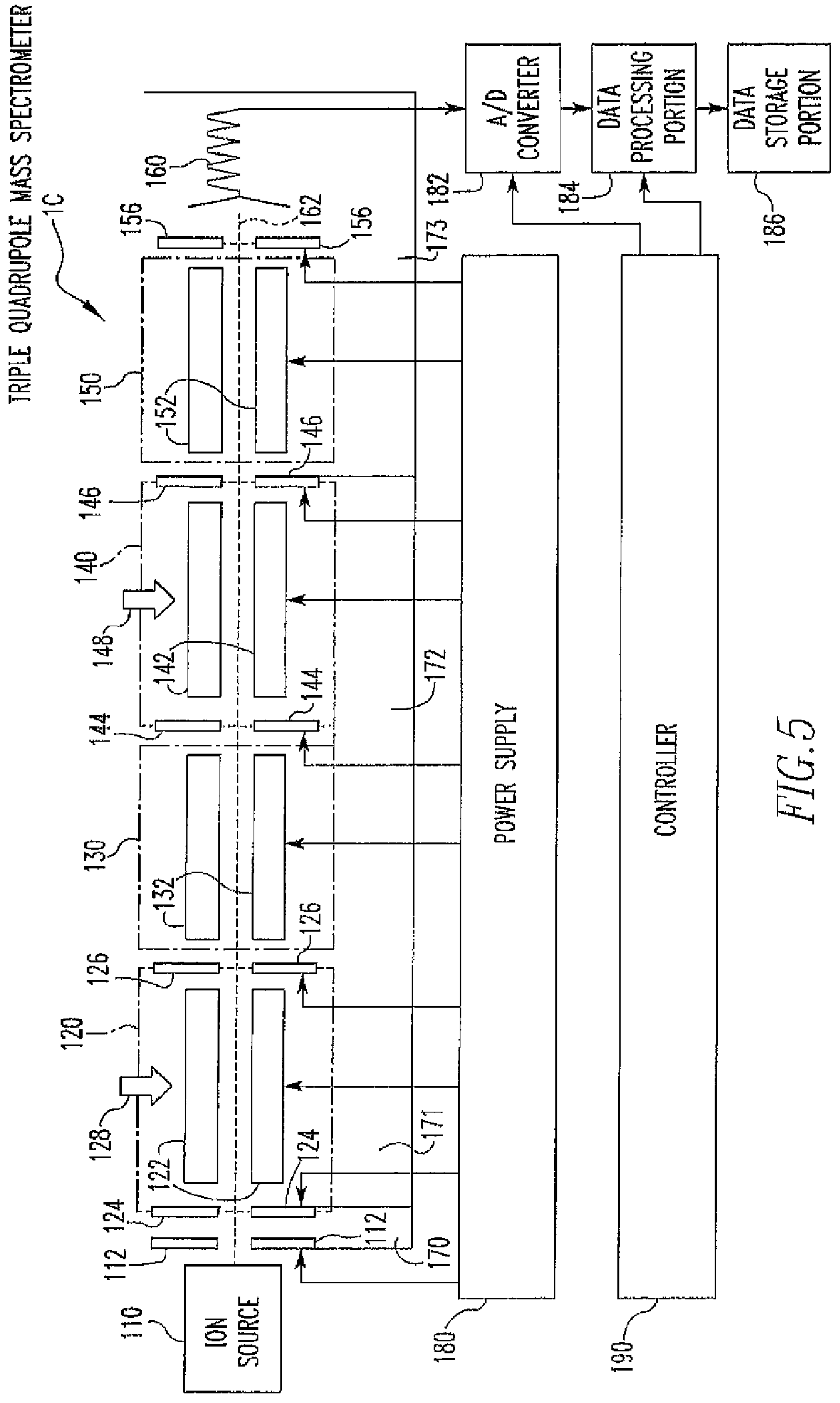
FIG. 5 is a block diagram of a mass spectrometer according to a second embodiment of the invention.

As shown in FIG. 5, the triple quadrupole mass spectrometer 1C of the second embodiment is indicated by 1C and configured including an ion source 110, an ion storage portion 120, a first mass analyzer 130, a collision cell 140, a second mass analyzer 150, a detector 160, a power supply 180, an A/D converter 182, a data processing portion 184, a data storage portion 186, and a controller 190. Some of the components of the triple quadrupole mass spectrometer of the present embodiment shown in FIG. 5 may be omitted.

The ion source 110 ionizes a sample introduced from a sample introduction device (not shown) such as a chromatograph by a desired method. The ion source 110 is made, for example, of an atmospheric-pressure continuous ion source in the same way as the ion source 10 shown in FIG. 1.

An electrode 112 centrally provided with an aperture is mounted behind the ion source 110. An ion storage portion 120 is mounted behind the electrode 112.

The ion storage portion 120 has an ion guide 122. An entrance electrode 124 and an exit electrode 126 are disposed at the opposite ends of the ion guide 122. Furthermore, the ion storage portion 120 is equipped with a gas introduction device 128 (such as a needle valve) for introducing gas from the outside. The ion guide 122 is fabricated using a multipole such as a quadrupole or a hexapole. Each of the entrance electrode 124 and exit electrode 126 is centrally provided with an aperture. The function of the ion storage portion 120 is similar to that of the ion storage portion 20 shown in FIG. 1 and so its description is omitted.

The first mass analyzer 130 including a quadrupole mass filter 132 is mounted behind the ion storage portion 120. The first mass analyzer 130 selects a first ion species from pulsed ions expelled from the ion storage portion 120 according to their mass-to-charge ratio and passes pulsed ions including the first ion species. Specifically, the first mass analyzer 130 selects and passes ions with m/z corresponding to the select voltages (RF voltage and DC voltage) applied to the quadrupole mass filter 132. The ions selected by the first analyzer 130 are referred to as precursor ions.

The collision cell 140 including an ion guide 142 is mounted behind the first mass analyzer 130. An entrance electrode 144 and an exit electrode 146 are disposed at the opposite ends of the ion guide 142. Furthermore, the cell 140 is equipped with a gas introduction device 148 such as a needle valve for introducing gas such as helium or argon from the outside. Each of the entrance electrode 144 and exit electrode 146 is centrally provided with an aperture. When gas is introduced into the collision cell 140, the precursor ions collide with gaseous molecules. As a result, the precursor ions are fragmented with some probability provided that the collisional energy is equal to or higher than the dissociation energy of the precursor ions. The collisional energy is substantially equal to the difference in potential energy due to the potential difference between the axial voltages across the ion guides 122 and 124. The ions fragmented in the collision cell 140 are referred to as product ions.

The second mass analyzer 150 including a quadrupole mass filter 152 is mounted behind the collision cell 140. The second mass analyzer 150 selects a second ion species from the pulsed ions expelled from the collision cell 140 according to their mass-to-charge ratio and passes pulsed ions including the second ion species. In particular, the second mass analyzer 150 selects and passes ions with m/z corresponding to the select voltages (RF voltage and DC voltage) applied to the quadrupole mass filter 152.

The pair of mass-to-charge ratios of ions selected respectively by the first mass analyzer 130 and second mass analyzer 150 is referred to as a transition. Normally, transitions are used to represent pairs of ions with m/z values when the instrument operates in a multiple reaction mode (MRM) in which ions selected by the first mass analyzer 130 and ions selected by the second mass analyzer 150 are fixed. Pairs of mass-to-charge ratios of ions selected respectively by the first mass analyzer 130 and the second mass analyzer 150 can be defined at some instant of time for product ion scan performed by the second mass analyzer 150, precursor ion scan performed by the first mass analyzer 130, and neutral loss scan performed by both mass analyzers. Therefore, combinations (pairs) of in/z values used in these cases are also herein referred to as transitions.

An electrode 156 centrally provided with an aperture is mounted behind the second mass analyzer 150. The detector 160 is mounted behind the electrode 156. The function of the detector 160 is similar to that of the detector 60 shown in FIG. 1 and so its description is omitted.

The space between the electrode 112 and the entrance electrode 124 of the ion storage portion 120 forms a first differential pumping chamber 170. The space between the entrance electrode 124 of the storage portion 120 and the exit electrode 126 forms a second differential pumping chamber 171. The space between the exit electrode 126 of the storage portion 120 and the exit electrode 146 of the collision cell 140 forms a third differential pumping chamber 172. The space behind the exit electrode 146 of the collision cell 140 forms a fourth differential pumping chamber 173.

The analog output signal from the detector 160 is applied to the A/D converter 182, where the signal is converted into a digital signal. The digital signal from the A/D converter 182 is applied to the data processing portion 184. In the data processing portion 184, digital signals are accumulated or averaged and the ion intensities in each transition (pair of m/z values) are computed. The ion intensities are correlated with the transitions and stored in the data storage portion 186.

The power supply 180 applies desired voltages to the electrodes 112, 124, 126, 144, 146, 156, ion guides 122, 142, and quadrupole mass filters 132, 152 independently or interlockingly so that ions travel from the ion source 110 to the detector 160 along the optical axis 162. In particular, the power supply 180 applies the desired voltages to the electrodes 112 and 124 such that ions created by the ion source 110 reach the ion storage portion 120. Furthermore, the power supply 180 applies the desired voltages to the electrode 124, ion guide 122, and electrode 126 such that the ion storage portion 120 repeatedly performs the ion-storing operation and the ion-expelling operation. In addition, the power supply 180 applies the desired voltages to the quadrupole mass filter 132 and electrode 144 such that the first mass analyzer 130 selects desired ions and that the selected ions reach the collision cell 140. The power supply 180 applies the desired voltages to the electrode 144, ion guide 142, and electrode 146 so that the collision cell 140 creates product ions and that the product ions reach the second mass analyzer 150. Further, the power supply 180 applies desired voltages to the electrode 146, quadrupole mass filter 152, and electrode 156 such that desired ions are selected by the second mass analyzer 150 and that the selected ions reach the detector 160. The path (optical axis 162) along which ions are transported does not need to be a straight line as shown in FIG. 5. The path may be bent or curved to remove background ions.

The controller 190 controls the timing at which the voltages applied from the power supply 180 are switched and the operation timings of the A/D converter 182 and the data processing portion 184. The controller 190 maintains constant the mass-to-charge ratio of the first ions selected by the first mass analyzer 130 while pulsed ions including the first ions selected by the first mass analyzer 130 pass through the first mass analyzer 130. Furthermore, the controller maintains constant the mass-to-charge ratio of the second ions selected by the second mass analyzer 150 while pulsed ions including the second ions selected by the second mass analyzer 150 pass through the second mass analyzer 150.

(2) Operation

The operation of a triple quadrupole mass spectrometer 1C according to the second embodiment is next described. In the following description, it is assumed that ions created by the ion source 110 are positive ions. The created ions may also be negative ions, in which case the following principle can be applied if the voltage polarity is inverted.

The ions created by the ion source 110 pass through the aperture in the electrode 112 and enter the ion storage portion 120 through the first differential pumping chamber 170 and the entrance electrode 124.

The ions are once stored in the ion storage portion 120 and then expelled from it. Therefore, the power supply 180 applies a pulsed voltage to the exit electrode 126 of the ion storage portion 120. When the pulsed voltage applied to the exit electrode 126 is made higher than the axial voltage across the ion guide 122, the exit electrode 126 is closed, and the ions are stored in the storage portion 120. On the other hand, when the pulsed voltage applied to the exit electrode 126 is made lower than the axial voltage across the ion guide 122, the exit electrode 126 is opened, and the ions are expelled from the storage portion 120.

Since the ion source 110 is at atmospheric pressure, a large amount of air flows into the ion storage portion 120 through the aperture in the entrance electrode 124. The kinetic energy of the ions present in the storage portion 120 is reduced by collision with air flowed in. The energy of ions returning to the entrance electrode 124 after being bounced back to the potential barrier at the exit electrode 126 during ion storage becomes lower than the energy when they first pass across the entrance electrode 124. Therefore, it is possible to pass ions from the upstream side and to block ions returning from the downstream side by adjusting the voltage on the entrance electrode 124. Consequently, the storage efficiency of the ion storage portion 120 can be maintained almost at 100%.

Because the ions stored in the ion storage portion 120 decrease in kinetic energy due to collision with air, the total energy of the ions as they are expelled from the storage portion 120 becomes substantially equal to the potential energy due to the axial voltage across the ion guide 122. Where the amount of air entering from the entrance electrode 124 is insufficient and thus the decrease in the kinetic energy of the ions is insufficient, the storage efficiency is improved by introducing gas from the gas introduction means 128.

The select voltages (RF voltage and DC voltage) for selecting ions according to their mass-to-charge ratio are supplied to the quadrupole mass filter 132 of the first mass analyzer 130 from the power supply 180 to thereby set a desired axial voltage. Ions (precursor ions) selected according to the select voltages remain on the optical axis 162 and enter the collision cell 140.

The precursor ions entering the collision cell 140 collide with gas introduced from the gas introduction means 148. Some of the precursor ions fragment with some probability into various product ions. The product ions enter the second mass analyzer 150 together with unfragmented precursor ions.

Select voltages (RF voltage and DC voltage) for selecting ions according to their mass-to-charge ratio are supplied to the quadrupole mass filter 152 of the second mass analyzer 150 from the power supply 180 to set a desired axial voltage. Ions (product ions or precursor ions) selected according to the select voltages remain on the optical axis 162 and impinge on the detector 160.

The analog output signal from the detector 160 is sampled and converted into a digital signal by the A/D converter 182. The digital signal is accumulated or averaged by the data processing portion 184. Ion intensities in transitions (pairs of m/z values of ions selected by the first mass analyzer 130 and ions selected by the second mass analyzer 150) are computed. The ion intensities are stored in the data storage portion 186 together with identification information about the transitions.

In the present embodiment, ions are stored into and expelled from the ion storage portion 120. Therefore, pulsed ions pass through the components located downstream of the exit electrode 126. While the pulsed ions pass through the first mass analyzer 130, the time width of the pulsed ions is substantially identical with the time in which the exit electrode 126 of the storage portion 120 is opened.

In one feature of the present embodiment, ions are stored in the ion storage portion 120 and thus ions can be prevented from entering the first mass analyzer 130 or the second mass analyzer 150 during the time during which the select voltages (RF voltage and DC voltage) are applied to the quadrupole mass filter 132 are changed and during the time during which the select voltages (RF voltage and DC voltage) are applied to the quadrupole mass filter 152 are changed. In other words, the first mass analyzer 130 selects only one ion species without varying the selected ion species (precursor ions) while individual pulsed ions expelled from the storage portion 120 are passing through the first mass analyzer 130. The second mass analyzer 150 selects one ion species without varying the selected ion species (product ions or precursor ions) while the individual pulsed ions passed through the collision cell 140 are passing through the second mass analyzer 150.

In the present embodiment, the power supply 180, A/D converter 182, and data processing portion 184 are operated from the personal computer (PC) (not shown) in a sequence specified by the user. Therefore, the intensity of ion species in a desired combination can be measured at a desired time.

Figure 6A:
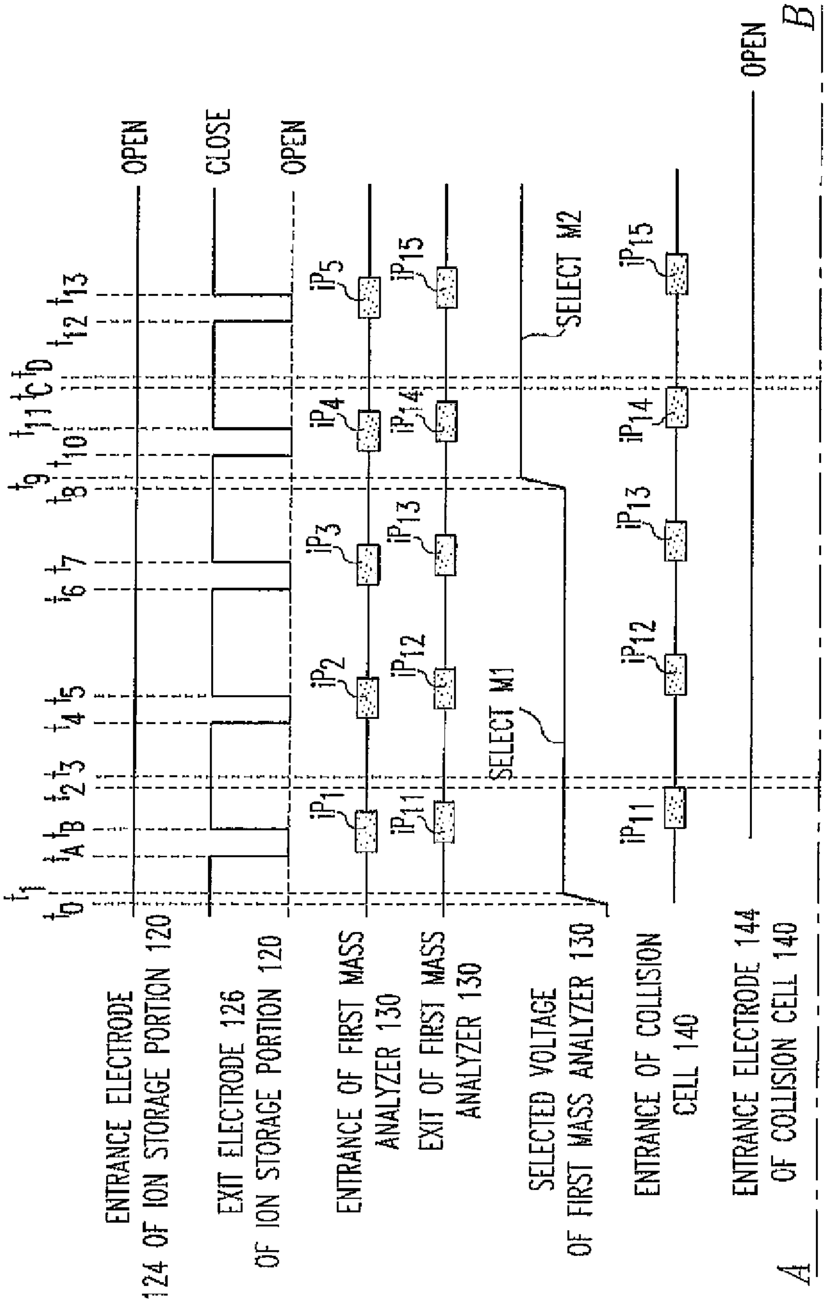
FIG. 6 is a timing chart illustrating one example of sequence of operations performed by a triple quadrupole mass spectrometer according to the second embodiment.
Figure 6B:
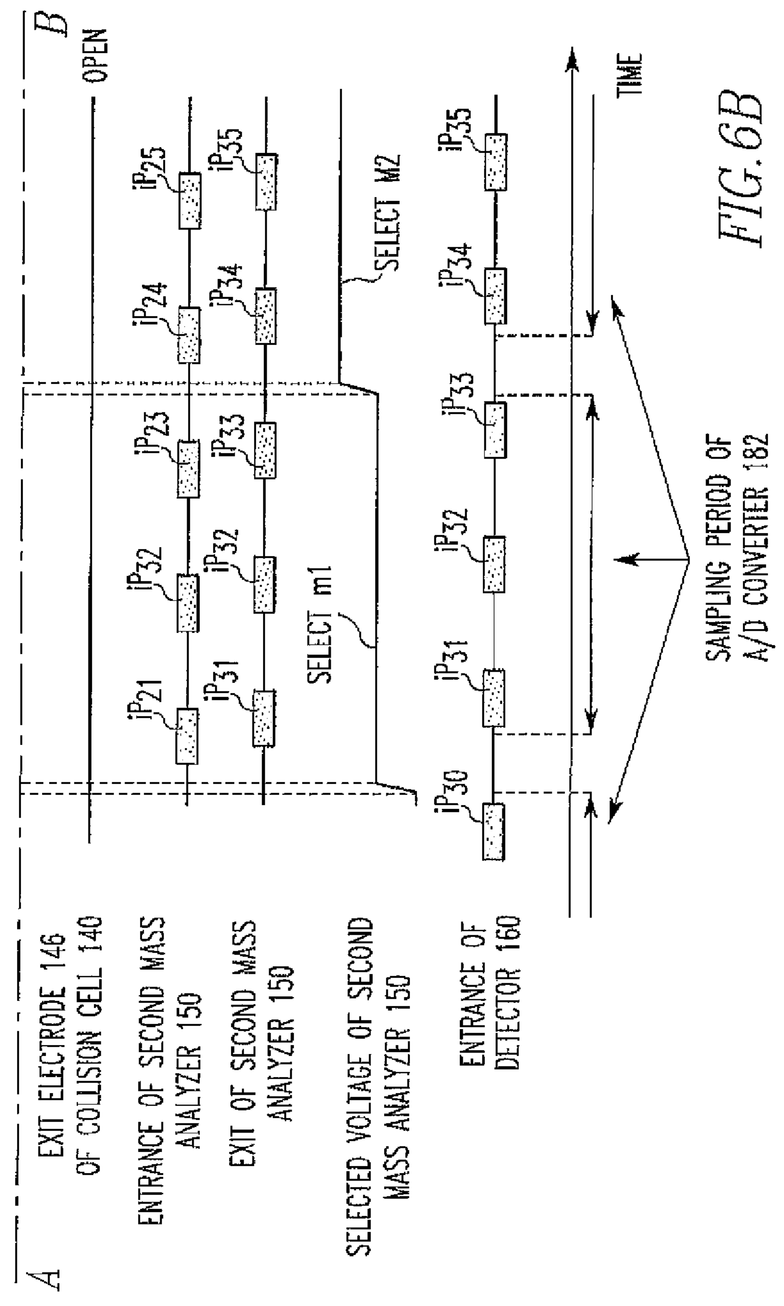

FIG. 6 is a timing chart showing one example of sequence of operations performed by the triple quadrupole mass spectrometer 1C. As shown in this figure, a constant voltage lower than the voltage on the electrode 112 is applied to the entrance electrode 122 of the ion storage portion 120. The entrance of the storage portion 120 is always open. Therefore, nearly 100% of ions generated in the ion source 110 are entered into the storage portion 120, where they are stored.

Two different voltages are periodically applied to the exit electrode 126 of the ion storage portion 120. When the voltage on the exit electrode 126 is higher than the axial voltage across the ion guide 122, the exit of the storage portion 120 is closed and ions are stored. On the other hand, when the voltage on the exit electrode 126 is lower than the axial voltage across the ion guide 122, the exit of the storage portion 120 is opened and ions are expelled. That is, the storage portion 120 repeatedly and alternately performs the storing operation and the expelling operation because the voltage on the exit electrode 126 of the storage portion 120 is periodically switched.

In particular, ions are stored in the ion storage portion 120 until the instant $t_2$. All or some of the ions stored in the storage portion 120 until the instant $t_2$ are expelled as pulsed ions $ip_1$ from the storage portion 120 during a period from the instant $t_2$ to $t_3$. All or some of ions stored in the storage portion 120 until the instant $t_4$ are expelled as pulsed ions $ip_2$ from the storage portion 120 during an interval from the instant $t_4$ to $t_5$. All or some of ions stored in the storage portion 120 until the instant $t_6$ are expelled as pulsed ions $ip_3$ from the storage portion 120 during an interval from the instant $t_6$ to $t_7$. All or some of ions stored in the storage portion 120 until the instant $t_{10}$ are expelled as pulsed ions $ip_4$ from the storage portion 120 during a period from the instant $t_{10}$ to $t_{11}$. All or some of ions stored in the storage portion 120 until the instant $t_{12}$ are expelled as pulsed ions $ip_5$ from the storage portion 120 during an interval from the instant $t_{12}$ to $t_{13}$. These pulsed ions $ip_1$ to $ip_5$ successively enter the first mass analyzer 130.

In the first mass analyzer 130, the select voltages (RF voltage and DC voltage) are switched during the interval from instant $t_0$ to $t_1$ and during the interval from the instant $t_8$ to $t_9$. Consequently, ions with m/z of M1 are selected during an interval from the instant $t_1$ to $t_8$. Ions with m/z of M2 are selected from instant $t_9$ on. Thus, pulsed ions $ip_1$, $ip_2$, and $ip_3$ become pulsed ions $ip_{11}$, $ip_{12}$, and $ip_{13}$, respectively, with m/z of M1 while passing through the first mass analyzer 130. Pulsed ions $ip_4$ and $ip_5$ become pulsed ions $ip_{14}$ and $ip_{15}$, respectively, with m/z of M2 while passing through the first mass analyzer 130. The pulsed ions $ip_{11}$ to $ip_{15}$ enter the collision cell 140.

The change time from the instant $t_8$ to $t_9$ is required for the select voltages to become stabilized when selected ions are changed from precursor ions with m/z of M1 to precursor ions with m/z of M2.

In one feature of the present embodiment, in order to prevent ions from entering the first mass analyzer 130 during the change time from the instant $t_8$ to $t_9$, the instant $t_8$ is later than the instant at which the last pulsed ion $ip_{13}$ out of ions with m/z of M1 selected by the first mass analyzer 130 finishes passing through the first mass analyzer 130. The instant $t_9$ is earlier than the instant at which the initial pulsed ion $ip_4$ out of ions with m/z of M2 selected by the first mass analyzer 130 begins to pass through the first mass analyzer 130.

A constant voltage lower than the voltage for opening the exit electrode 126 of the storage portion 120 is applied to the entrance electrode 144 of the collision cell 140. The entrance of the collision cell 140 is always open. Therefore, almost 100% of the ions passed through the first mass analyzer 130 enter the collision chamber 140. A constant voltage lower than the voltage on the entrance electrode 144 is also applied to the exit electrode 146 of the collision cell 140. The exit of the collision cell 140 is also open at all times. The pulsed ions $ip_{11}$ to $ip_{15}$ are partially fragmented into product ions while they are passing through the collision cell 140. They become pulsed ions $ip_{21}$ to $ip_{25}$ including the product ions at the exit of the collision cell 140. These pulsed ions $ip_{21}$ to $ip_{25}$ successively enter the second mass analyzer 150.

In the second mass analyzer 150, the select voltages (RF voltage and DC voltage) are switched during an interval from instant $t_A$ to $t_B$ and during an interval from instant $t_C$ to $t_D$. Consequently, ions with m/z of M1 are selected during an interval from $t_B$ to $t_C$. Ions with m/z of M2 are selected from the instant $t_D$ on. The change time from instant $t_C$ to $t_D$ is required until the select voltages become stabilized when the selected ions are changed from ions with ink of M1 to ions with m/z of M2.

The pulsed ions $ip_{21}$, $ip_{22}$, and $ip_{23}$ become pulsed ions $ip_{31}$, $ip_{32}$, and $ip_{33}$, respectively, of ions with m/z of M1 while they are passing through the second mass analyzer 150. The pulsed ions $ip_{24}$ and $ip_{25}$ become pulsed ions $ip_{34}$ and $ip_{35}$, respectively, of ions with m/z of M2 while they are passing through the second mass analyzer 150.

In one feature of the present embodiment, in order to prevent ions from entering the second mass analyzer 150 during the change time from instant $t_C$ to $t_D$. The instant $t_C$ is later than the instant at which the last pulsed ion $ip_{33}$ out of ions with m/z of M1 selected by the second mass analyzer 150 finishes passing through the second mass analyzer 150. The instant $t_D$ is earlier than the instant at which the initial pulsed ion $ip_{24}$ out of ions with m/z of M2 selected by the second mass analyzer 150 begins to pass through the second mass analyzer 150.

The pulsed ions $ip_{31}$ to $ip_{35}$ passed through the second mass analyzer 150 enter the detector 160. Pulsed ions $ip_{30}$ are pulsed ions of ink of M0 incident on the detector 160 immediately prior to the pulsed ions $ip_{31}$. Where ions with m/z of M1 are sampled by the A/D converter 182, the instant at which the sampling is started is between the instant at which the last pulsed ion $ip_{30}$ out of selected ions with m/z of M0 finishes entering the detector 160 and the instant at which the first pulsed ion $ip_{31}$ out of ions with m/z of M1 begins to enter the detector 160. The instant at which the sampling ends is between the instant at which the final pulsed ion $ip_{33}$ out of selected ions with m/z of M1 finishes entering the detector 160 and the instant at which the initial pulsed ion $ip_{34}$ out of selected ions with m/z of M2 begins to enter the detector 160.

The data processing portion 184 accumulates or averages all signals digitized by sampling of selected ions. The resulting values are stored as ion intensities in various transitions (pairs of m/z values) into the data storage portion 186.

According to the triple quadrupole mass spectrometer 1C of the second embodiment described so far, ions are once stored in the ion storage portion 120 and then pulsed and expelled to thereby prevent ions from entering the first mass analyzer 130 during the change time of the first mass analyzer 130 and to prevent ions from entering the second mass analyzer 150 during the change time of the second mass analyzer 150. Therefore, ion loss can be suppressed compared with the conventional quadrupole mass spectrometer performing no ion-storing operation.

In the present embodiment, the integrated intensity of each pulsed ion incident on the detector 160 is made an ion intensity in each transition (pair of m/z values) by expelling one pulsed ion from the ion storage portion 120. Where opening time and closure time of the exit electrode 126 of the storage portion 120 are kept constant, the ion intensity in each transition is in proportion to the amount of selected ions created from the ion source 110 during a given time, i.e., for a given period between aperture and closure. As a result, it follows that ions created at regular intervals from the ion source 110 are observed. Consequently, the intensities in various transitions can be compared.

(3) Modifications

First Modification

In the triple quadrupole mass spectrometer 1C of the second embodiment, it is easy to set the sampling time of the A/D converter 182. However, sampling is performed also during a time for which no pulsed ions are detected, e.g., from the instant when detection of the pulsed ion $ip_{31}$ ends to the instant when detection of the next pulsed ion $ip_{32}$ is started. The sampling leads to acceptance of noise rather than ions. Hence, the signal-to-noise ratio will be deteriorated.

Accordingly, in a first modification, this problem is solved by sampling each pulsed ion continuously. In this first modification, sampling is done while at least individual pulsed ions are hitting the detector 160 in such a way that intervals during which individual pulsed ions are sampled do not overlap with each other.

The configuration of the triple quadrupole mass spectrometer of this first modification is similar to the configuration shown in FIG. 5 except for the sampling timing used by the A/D converter 182 and so its description and illustration are omitted.

Figure 7A:
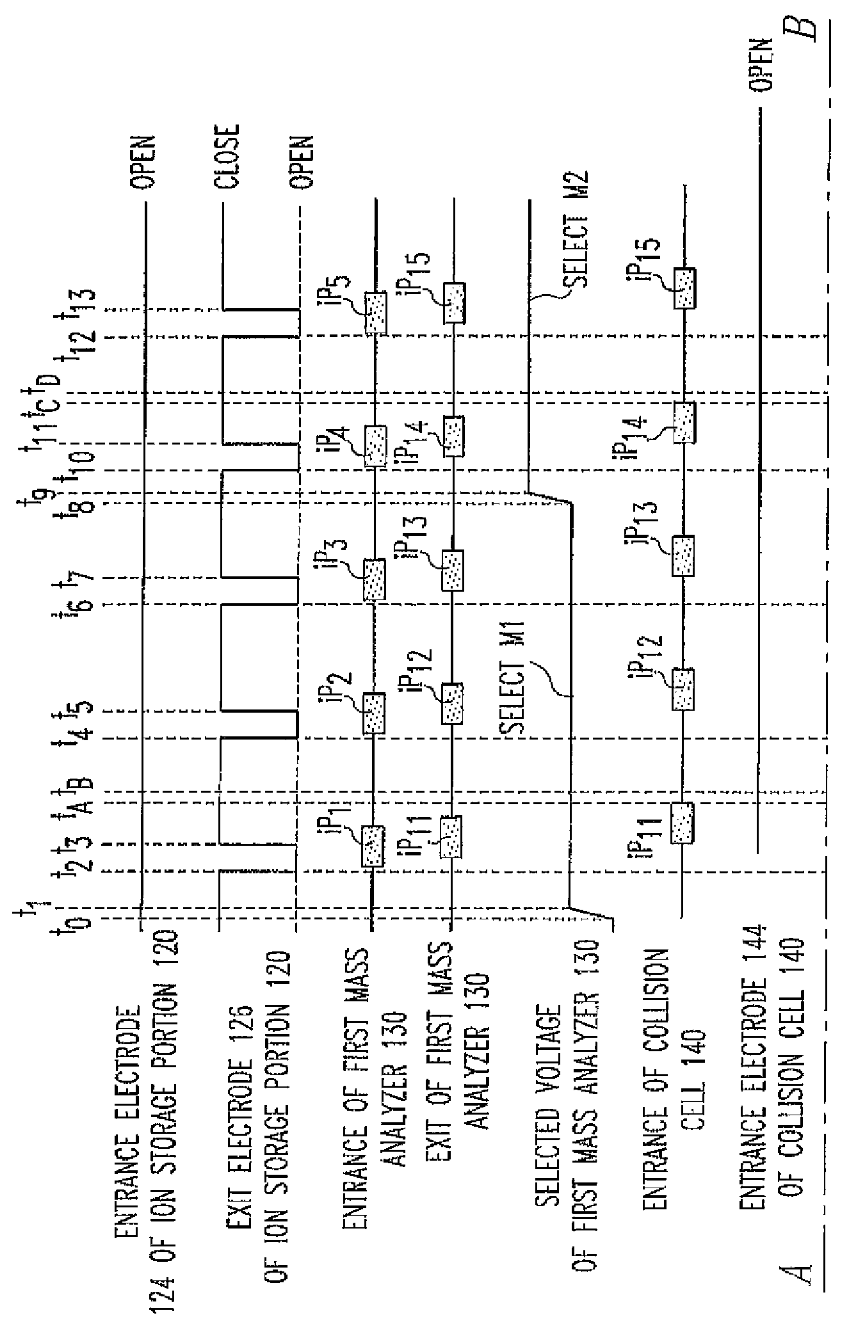
FIG. 7 is a timing chart illustrating one example of sequence of operations performed by a triple quadrupole mass spectrometer that is a first modification of the second embodiment.
Figure 7B:
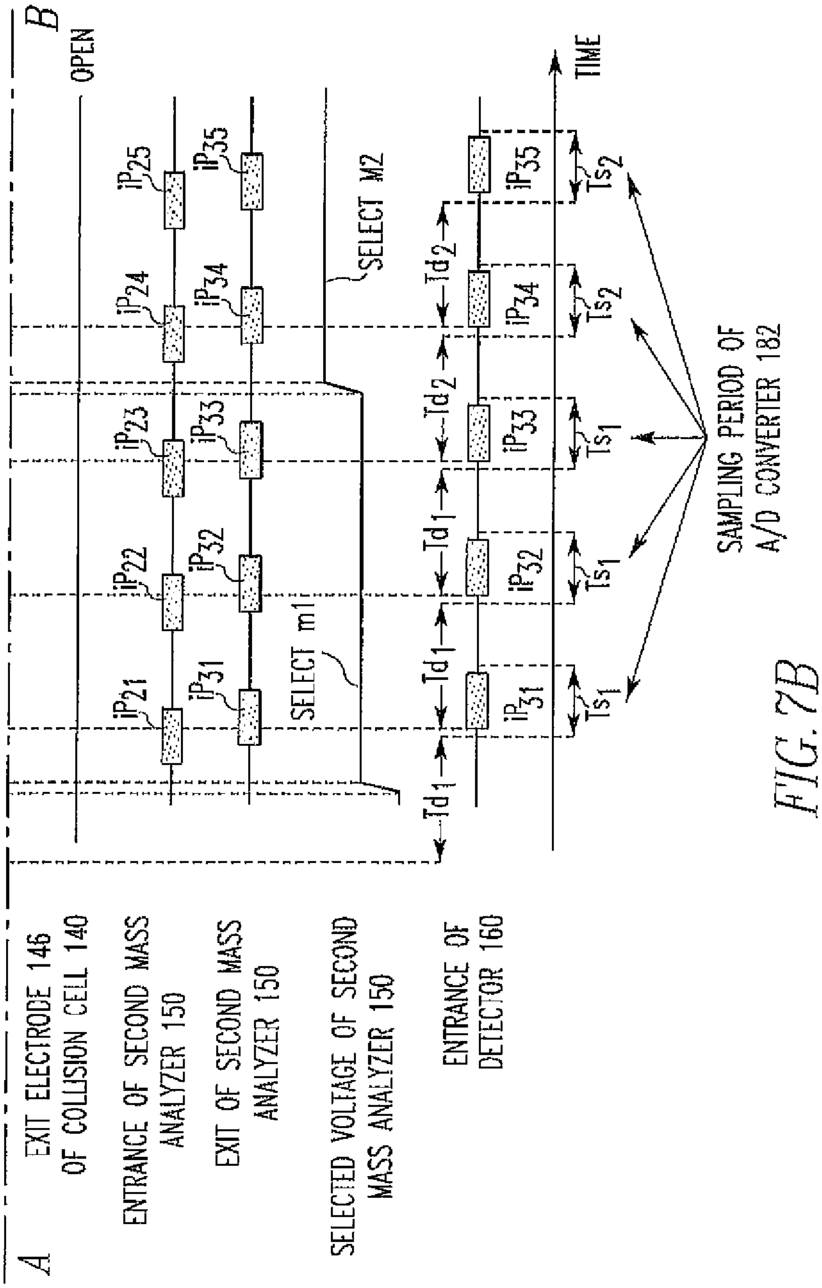

FIG. 7 is a timing chart illustrating one example of sequence of operations performed by the triple quadrupole mass spectrometer of this first modification. In the sequence illustrated in FIG. 7, the processing steps conducted until the pulsed ions $ip_{31}$ to $ip_{35}$ impinge on the detector 160 are the same as their corresponding steps illustrated in FIG. 6 and thus their description is omitted.

Where the pulsed ion $ip_{32}$, for example, is sampled by the A/D converter 182, the instant when the sampling is started is between the instant when sampling of the pulsed ion $ip_{31}$ hitting the detector 160 immediately therebefore ends and the instant when the pulsed ion $ip_{32}$ begins to hit the detector 160. The instant at which the sampling ends is between the instant when the pulsed ion $ip_{32}$ finishes hitting the detector 160 and the instant when sampling of the pulsed ion $ip_{33}$ hitting the detector 160 immediately thereafter begins. Acceptance of unwanted noise is prevented and the detection sensitivity can be enhanced by performing sampling by the A/D converter 182 only during the time for which pulsed ions are hitting the detector in this way. As the time during which sampling is done by the A/D converter 182 agrees more closely with the time during which pulsed ions are detected by the detector 160, the signal-to-noise ratio is improved.

Digital signals produced by sampling pulsed ions $ip_{31}$, $ip_{32}$, and $ip_{33}$ by the A/D converter 182 are accumulated or averaged by the data processing portion 184 to thereby obtain ion intensities. The ion intensities are stored in the data storage portion 186 together with identification information about the transitions (pairs of mass-to-charge ratios M1 of ions selected by the first mass analyzer 130 and mass-to-charge ratios m1 of ions selected by the second mass analyzer 130).

Where pulsed ions are sampled in this way, the instrument may be so preset that sampling is done only for a given time of operation after a given delay time from the instant when an expelling operation of the ion storage portion 120 is started as shown in FIG. 7. For example, in the case of the pulsed ion $ip_{31}$, sampling is performed for the time of operation $Ts_1$ after a delay of time $Td_1$ from the instant $t_2$ at which an operation for expelling the pulsed ion $ip_1$ (on which the pulsed ion $ip_{31}$ is based) was started by the ion storage portion 120. Also, with respect to sampling of the other pulsed ions $ip_{32}$, $ip_{33}$, $ip_{34}$, and $ip_{35}$, delay times from the instants $t_4$, $t_6$, $t_{10}$, and $t_{12}$ at which operations for expelling the pulsed ions $ip_2$, $ip_3$, $ip_4$, and $ip_5$ (on which those pulsed ions are based) from the ion storage portion 120 are set, as well as times of operation for performing sampling.

Where the time in which the exit electrode 126 of the storage portion 120 is opened is constant, pulsed ions having the same transition are identical in flight velocity and time width and, therefore, these ions can be sampled with the same delay time and same time of operation. For example, where three pulsed ions $ip_{31}$, $ip_{32}$, and $ip_{33}$ are sampled such that ions of m/z with M1 and m1 are selected by the first mass analyzer 130 and the second mass analyzer 150, respectively, all the delay times can be set to the same time $Td_1$ and all the times of operation can be set to the same time $Ts_1$ provided that opening times $t_3$-$t_2$, $t_5$-$t_4$, and $t_7$-$t_6$ for expelling the pulsed ions $ip_1$, $ip_2$, and $ip_3$ (on which those pulsed ions are based) are set to the same time.

Where the transition is varied, the flight velocity and time width of pulsed ions expelled from the exit electrode 126 of the ion storage portion 120 are also varied. For example, the delay time $Td_1$ for the pulsed ion $ip_{31}$ enabling ions with in/z of M1 and m1 to be selected by the first mass analyzer 130 and the second mass analyzer 150, respectively, is different from the delay time $Td_2$ for the pulsed ion $ip_{34}$ enabling ions with ink of M2 and m2 to be selected by the first mass analyzer 130 and the second mass analyzer 150, respectively. Their times of operation $Ts_1$ and $Ts_2$ are also different from each other. That is, the delay time and the time of operation are varied according to selected ion.

Second Modification

Figure 8:
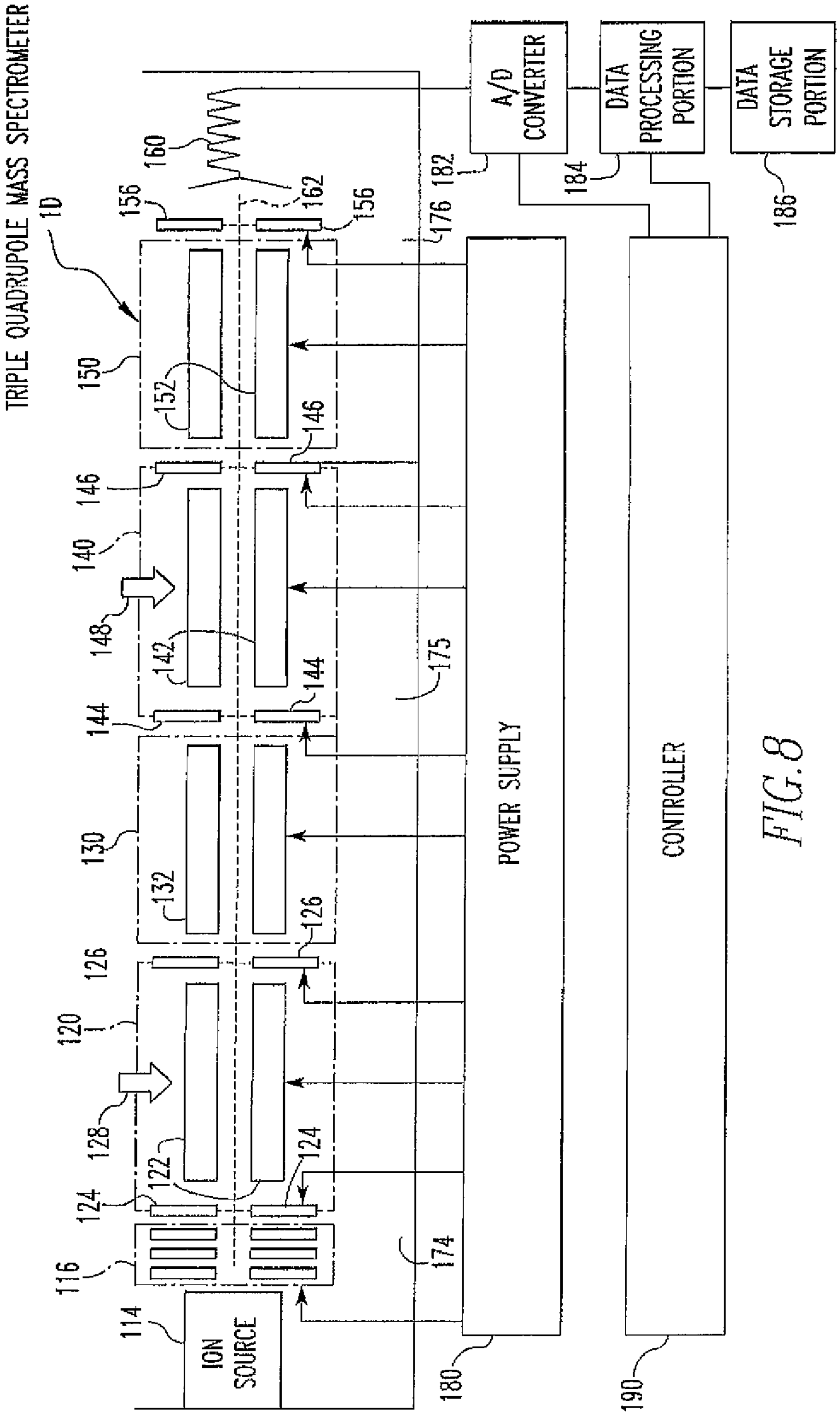
FIG. 8 is a block diagram of a triple quadrupole mass spectrometer of a second modification of the second embodiment.

In the second embodiment, the atmospheric-pressure ion source 110 is used. The second embodiment may be so modified that an ion source (such as an EI (electron impact) ion source for ionizing a sample by impacting the sample with electrons) for ionizing a sample in a vacuum is used. FIG. 8 shows the configuration of this second modification. In both FIGS. 5 and 8, like components are indicated by like reference numerals and their description is omitted.

Referring to FIG. 8, a triple quadrupole mass spectrometer according to this second modification is generally indicated by 1D and differs from the triple quadrupole mass spectrometer 1C shown in FIG. 5 in that it has an ion source 114 instead of the ion source 110 and that a focusing lens 116 consisting of plural electrodes is mounted between the ion source 114 and the entrance electrode 124 of the ion storage portion 120. Furthermore, the instrumental section extending from the ion source 114 to the exit electrode 126 of the storage portion 120 forms a first differential pumping chamber 174. The section from the exit electrode 126 of the storage portion 120 to the exit electrode 146 of the collision chamber 140 forms a second differential pumping chamber 175. The space located behind the exit electrode 146 of the collision cell 140 forms a third differential pumping chamber 176. In the quadrupole mass spectrometer 1D, the ion source 114 is in a vacuum. To enhance the ion storage efficiency of the storage portion 120, gas is introduced from the gas introduction means 128 to lower the kinetic energies of ions. The instrument 1D is similar in other operations to the instrument 1C and so its description is omitted.

3. Third Embodiment (1) Configuration

Generally, precursor ions are fragmented into product ions with some probability. Therefore, in the above-described triple quadrupole mass spectrometer 1C of the second embodiment, pulsed ions broaden within the collision cell 140. For example, in the example of FIG. 6, the pulsed ion $ip_{11}$ impinging on the collision cell 140 becomes the broader pulsed ion $ip_{21}$ as it emerges from the collision cell 140. As a result, the pulsed ion $ip_{31}$ impinging on the detector 160 broadens. Generally, as a pulsed ion hitting the detector 160 becomes wider, the sensitivity at which the ion intensity is detected is deteriorated.

Accordingly, in the triple quadrupole mass spectrometer according to the third embodiment, ions are once stored in the collision cell 140 and then expelled as well as in the ion storage portion 120. Consequently, pulsed ions hitting the detector 160 are narrowed.

In particular, the power supply 180 applies desired voltages to the electrode 144, ion guide 142, and electrode 146 such that product ions are stored in and expelled from the collision cell 140 repeatedly.

Since the configuration of the triple quadrupole mass spectrometer of the third embodiment is similar to the configuration shown in FIG. 5, its description and illustration are omitted.

(2) Operation

The operation of the triple quadrupole mass spectrometer of the third embodiment is next described. In the following description, it is assumed that ions created by the ion source 110 are positive ions. The ions may also be negative ions. The following theory can also be applied to the case of negative ions if the voltage polarity is inverted.

Since the ion source 110, ion storage portion 120, and first mass analyzer 130 are identical in operation with the triple quadrupole mass spectrometer 1C of the second embodiment, its operation is omitted.

Precursor ions entered into the collision cell 140 are once stored in the collision cell 140 and then collide with gas introduced through the gas introduction means 148. As a result, some of the precursor ions are fragmented into various product ions with some probability. The product ions are expelled from the collision cell 140 together with unfragmented precursor ions.

In order that ions be stored in and expelled from the collision cell 140 repeatedly, a pulsed voltage is applied to the exit electrode 146 of the collision cell 140 from the power supply 180. When the pulsed voltage applied to the exit electrode 146 is made higher than the axial voltage across the ion guide 142, the exit electrode 146 is closed. Under this condition, the ions are stored in the collision cell 140. On the other hand, when the pulsed voltage impressed on the exit electrode 146 is made lower than the axial voltage across the ion guide 142, the exit electrode 146 is opened. Under this condition, ions are expelled from the collision cell 140. Collision gas such as a rare gas is introduced into the collision cell 140 through the gas introduction means 148.

The collision gas has the effect of promoting generation of product ions by fragmenting precursor ions. In addition, the gas has the effect of lowering the kinetic energies of ions within the collision cell 140 by collision. Therefore, the energies of ions returning to the entrance electrode 144 after being bounced back to the potential barrier of the exit electrode 146 during ion storage become lower than those of the ions first passing through the entrance electrode 144. It is possible to pass ions coming from the upstream side and to block ions returning from the downstream side by adjusting the voltage on the entrance electrode 144. In consequence, the storage efficiency at the collision cell 140 can be maintained at substantially 100%. During ion storage, precursor ions and product ions reciprocate between the entrance electrode 144 and the exit electrode 146 while repeatedly colliding with the collision gas. As a result, the kinetic energies are almost lost. Consequently, the total energy of ions expelled from the collision cell 140 becomes substantially equal to the potential energy owing to the axial voltage across the ion guide 142.

Pulsed ions expelled from the collision cell 140 are entered into the second mass analyzer 150. Since the operation of the second mass analyzer 150 is the same as the operation of the triple quadrupole mass spectrometer 1C of the second embodiment, its description is omitted. Furthermore, the detector 160, A/D converter 182, data processing portion 184, and data storage portion 186 are identical in operation to the triple quadrupole mass spectrometer 1C of the second embodiment and so their description is omitted.

In one feature of the present embodiment, ions are stored in and expelled from the ion storage portion 120 and collision cell 140 to prevent ions from being entered into the first mass analyzer 130 and the second mass analyzer 150 during the change time during which the select voltages (RF voltage and DC voltage) applied to the quadrupole mass filter 132 are varied and during the change time during which the select voltages (RF voltage and DC voltage) applied to the quadrupole mass filter 152 are varied. In other words, while individual pulsed ions expelled from the ion storage portion 120 are passing through the first mass analyzer 130, the first mass analyzer 130 selects only one ion species without varying the selected ion species (precursor ions). While individual pulsed ions expelled from the collision cell 140 are passing through the second mass analyzer 150, the second mass analyzer 150 selects only one species without varying the selected ion species (product ions or precursor ions).

Figure 9A:
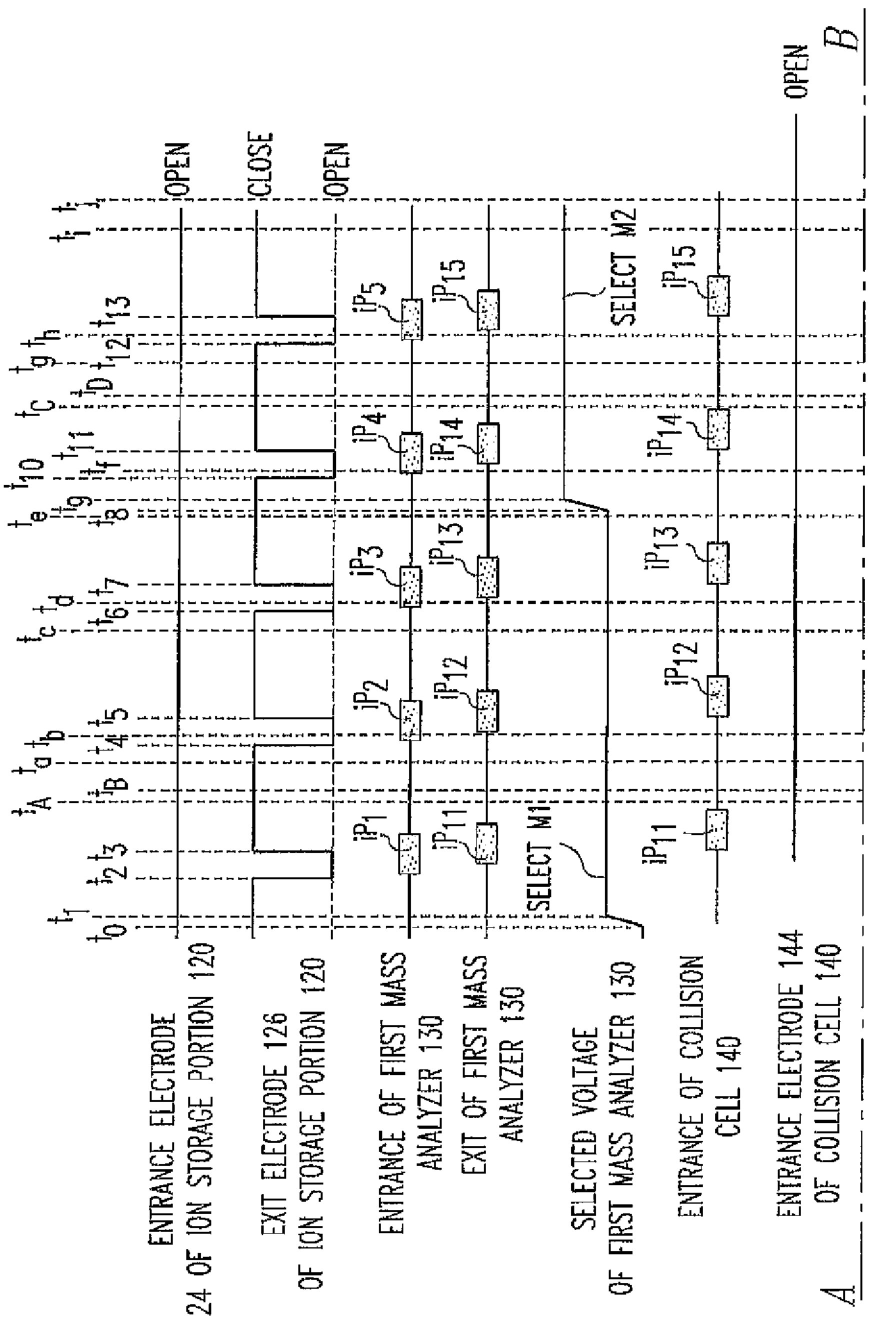
FIG. 9 is a timing chart illustrating one example of sequence of operations of a triple quadrupole mass spectrometer according to a third embodiment of the invention.
Figure 9B:
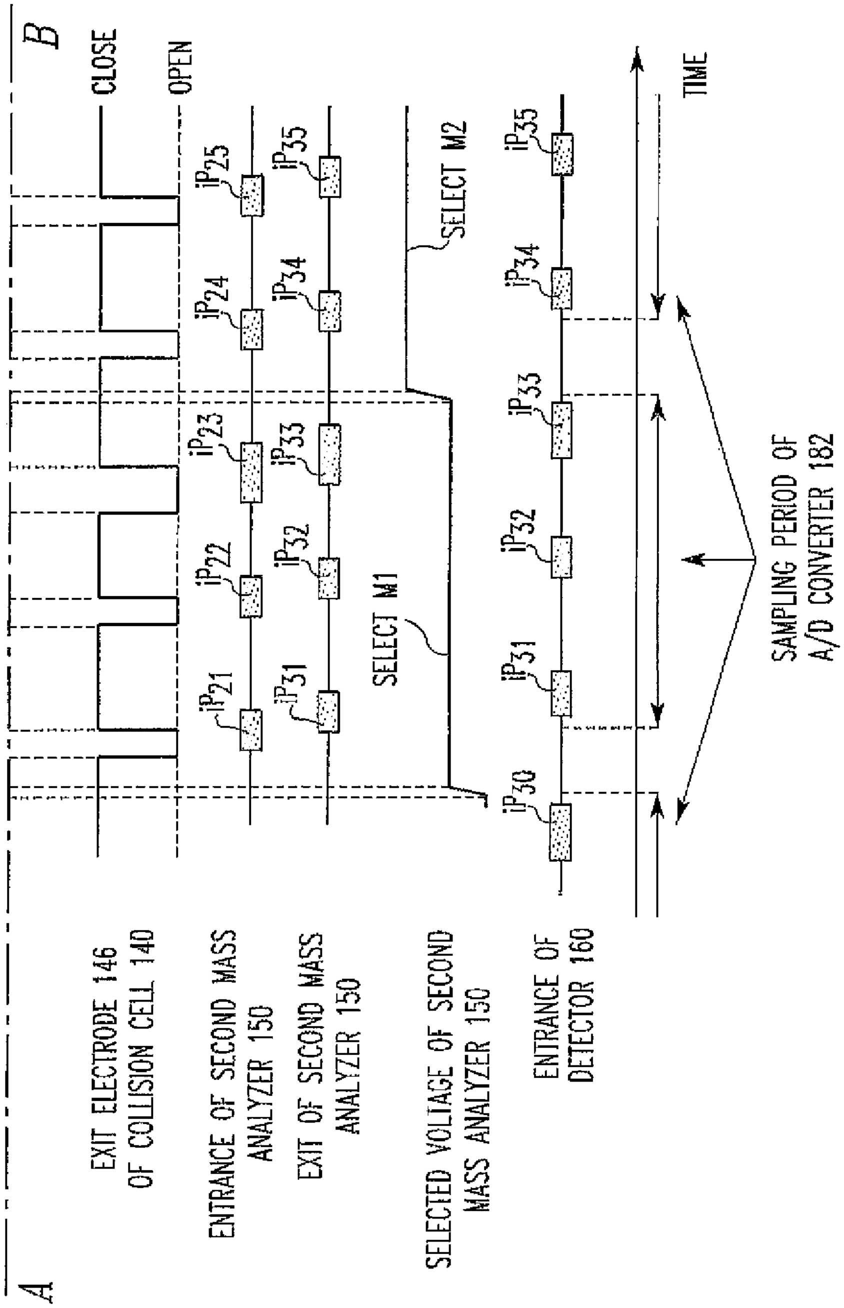

FIG. 9 is a timing chart illustrating one example of sequence of operations performed by a triple quadrupole mass spectrometer according to a third embodiment of the present invention. In the sequence illustrated in FIG. 9, the processing steps conducted until the pulsed ions $ip_{11}$ to $ip_{15}$ impinge on the collision cell 140 are the same as the corresponding steps illustrated in FIG. 6 and thus their description is omitted.

A constant voltage lower than the voltage for opening the exit electrode 126 of the storage portion 120 is applied to the entrance electrode 144 of the collision cell 140. The entrance of the collision cell 140 is always open. Therefore, almost 100% of the precursor ions passed through the first mass analyzer 130 enter the collision chamber 140. Two different voltages are periodically applied to the exit electrode 146 of the collision cell 140. When the voltage on the exit electrode 146 is higher than the axial voltage across the ion guide 142, the exit of the collision cell 140 is closed and ions are stored. On the other hand, when the voltage on the exit electrode 146 is lower than the axial voltage across the ion guide 142, the exit of the collision cell 140 is opened and product ions and unfragmented precursor ions are expelled. That is, the collision cell 140 repeatedly and alternately performs the storing operation and the expelling operation because the voltage on the exit electrode 146 of the collision cell 140 is periodically switched.

In particular, ions are stored in the collision cell 140 until instant $t_a$. All or some of the ions stored in the collision cell 140 until the instant $t_a$ are expelled as the pulsed ion $ip_{21}$ from the collision cell 140 during an interval from instant $t_a$ to $t_b$. All or some of the ions stored in the collision cell 140 until instant $t_c$ are expelled as the pulsed ion $ip_{22}$ from the collision cell 140 during an interval from instant $t_c$ to $t_d$. All or some of ions stored in the collision cell 140 until instant $t_e$ are expelled as the pulsed ion $ip_{23}$ from the collision cell 140 during an interval from instant $t_e$ to $t_f$. All or some of the ions stored in the collision cell 140 until instant $t_g$ are expelled as the pulsed ion $ip_{24}$ from the collision cell 140 from an interval from instant $t_g$ to $t_h$. All or some of the ions stored in the collision cell 140 until the instant $t_i$ are expelled as the pulsed ion $ip_{25}$ from the collision cell 140 during an interval from instant $t_i$ to $t_j$.

To enhance the efficiency at which precursor ions are fragmented in the collision cell 140, it is advantageous to increase the storage time. For this purpose, the instant at which pulsed ions begin to enter the collision cell 140 may be placed immediately after the exit electrode 146 is closed. For example, it is better that the instant at which the pulsed ion $ip_{12}$ begins to enter the collision cell 140 is placed immediately after the instant $t_b$ at which the exit electrode 146 is closed for storing the pulsed ions. Where it is difficult to make this setting, the exit electrode 146 is closed while pulsed ions are entering the collision cell 140 such that the ions can be stored.

Where precursor ions are modified by the first mass analyzer 130, all the ions in the collision cell 140 are expelled before the modified precursor ions enter the collision cell 140. Consequently, product ions inside the collision cell 140 arise always from one precursor ion, thus suppressing crosstalk between transitions (different pairs of m/z values). For example, since the mass-to-charge ratio of precursor ions changes from M1 to M2 during the interval from the instant $t_8$ to $t_9$, the time $t_f$-$t_e$ in which the exit electrode 146 is opened to expel precursor ions with m/z of M1 and the final pulsed ion $ip_{23}$ including its product ions from the collision cell 140 needs to be long enough to expel all the ions from within the collision cell 140. Where it is difficult to achieve this need, all pulsed ions $ip_{23}$ with m/z of m1 selected by the second mass analyzer 150 are expelled from the collision cell 140 during the opening time $t_f$-$t_e$.

Where pulsed ions expelled from the collision cell 140 are not the final pulsed ion prior to a modification of the transition (specific pair of m/z values) or where the pulsed ions are the final pulsed ion and precursor ions selected by the first mass analyzer 130 remain the same in spite of the modification of the transition, it is not necessary to expel all the ions in the collision cell 140. For example, the pulsed ions $ip_{21}$, $ip_{22}$, $ip_{24}$, and $ip_{25}$ are not the final pulsed ion prior to modification of the transition and, therefore, the expelling operation performed during intervals from instant $t_a$ to $t_b$, from $t_c$ to $t_d$, from $t_g$ to $t_h$, and $t_i$ to $t_j$ does not need to expel all the ions in the collision cell 140.

The pulsed ions $ip_{21}$ to $ip_{25}$ expelled from the collision cell 140 successively enter the second mass analyzer 150.

In the second mass analyzer 150, the select voltages (RF voltage and DC voltage) are switched during an interval from instant $t_A$ to $t_B$ and during an interval from instant $t_C$ to $t_D$. Consequently, ions with m/z of M1 are selected during an interval from $t_B$ to $t_C$. From the instant $t_D$ on, ions with m/z of M2 are selected.

The pulsed ions $ip_{21}$, $ip_{22}$, and $ip_{23}$ become pulsed ions $ip_{31}$, $ip_{32}$, and $ip_{33}$, respectively, with m/z of M1 while passing through the second mass analyzer 150. Furthermore, the pulsed ions $ip_{24}$ and $ip_{25}$ become pulsed ions $ip_{34}$ and $ip_{35}$, respectively, with ink of M2 while passing through the second mass analyzer 150.

In one feature of the present embodiment, in order to prevent ions from entering the second mass analyzer 150 during the change time from the instant $t_C$ to $t_D$, the instant $t_C$ is later than the instant at which the last pulsed ion $ip_{33}$ out of ions with m/z of M1 selected by the second mass analyzer 150 finishes passing through the second mass analyzer 150. The instant $t_D$ is earlier than the instant at which the initial pulsed ion $ip_{24}$ out of ions with m/z of M2 selected by the second mass analyzer 150 begins to pass through the second mass analyzer 150.

The pulsed ions $ip_{31}$ to $ip_{35}$ passed through the second mass analyzer 150 enter the detector 160. The pulsed ion $ip_{30}$ is a pulsed ion with m/z of M0 incident on the detector 160 immediately earlier than the pulsed ion $ip_{31}$. Where ions of m/z of M1 are sampled by the A/D converter 182, the instant at which the sampling is started is between the instant at which the last pulsed ion $ip_{30}$ out of selected pulses of m/z of M0 finishes entering the detector 160 and the instant at which the initial pulsed ion $ip_{31}$ out of selected ions with ink of M1 begins to enter the detector 160. The instant at which the sampling ends is between the instant at which the last pulsed ion $ip_{33}$ out of selected ions of m/z of M1 finishes entering the detector 160 and the instant at which the initial pulsed ion $ip_{34}$ out of selected ions with in/z of M2 begins to enter the detector 160.

The data processing portion 184 accumulates or averages all signals digitized by sampling of selected ions. The resulting value is stored as the intensity in each transition (specific pair of m/z values) into the data storage portion 186.

The triple quadrupole mass spectrometer of the third embodiment described so far produces advantageous effects similar to those of the triple quadrupole mass spectrometer 1C of the second embodiment.

Furthermore, according to the present embodiment, ions are stored in the ion storage portion 120 and then expelled as pulsed ions. This makes it easy to control the time in which no ions impinge on the second mass analyzer 150. Therefore, it is easy to modify the ion selected by the second mass analyzer 150 during the time in which no ions enter the second mass analyzer 150.

The width of pulsed ions entering the detector 160 can be made narrower than in the second embodiment by storing ions in the collision cell 140 and expelling pulsed ions. Hence, deterioration of the detection sensitivity can be mitigated compared with the second embodiment.

(3) Modifications

First Modification

The triple quadrupole mass spectrometer according to the third embodiment may be so modified that the A/D converter 182 samples each pulsed ion continuously, in the same way as in this first modification of the triple quadrupole mass spectrometer 1C according to the second embodiment.

Figure 10A:
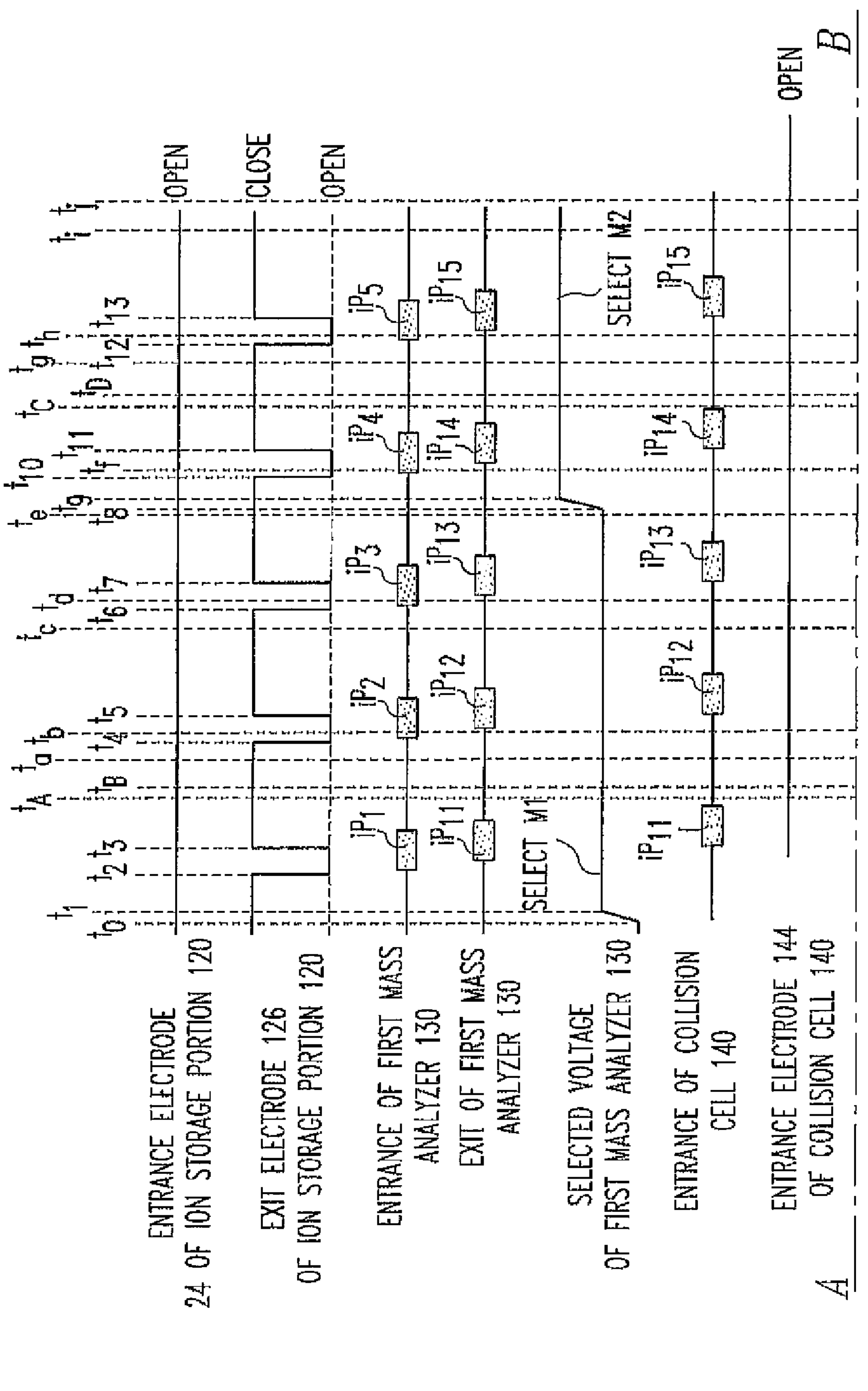
FIG. 10 is a timing chart illustrating one example of sequence of operations performed by a triple quadrupole mass spectrometer that is a first modification of the third embodiment.
Figure 10B:
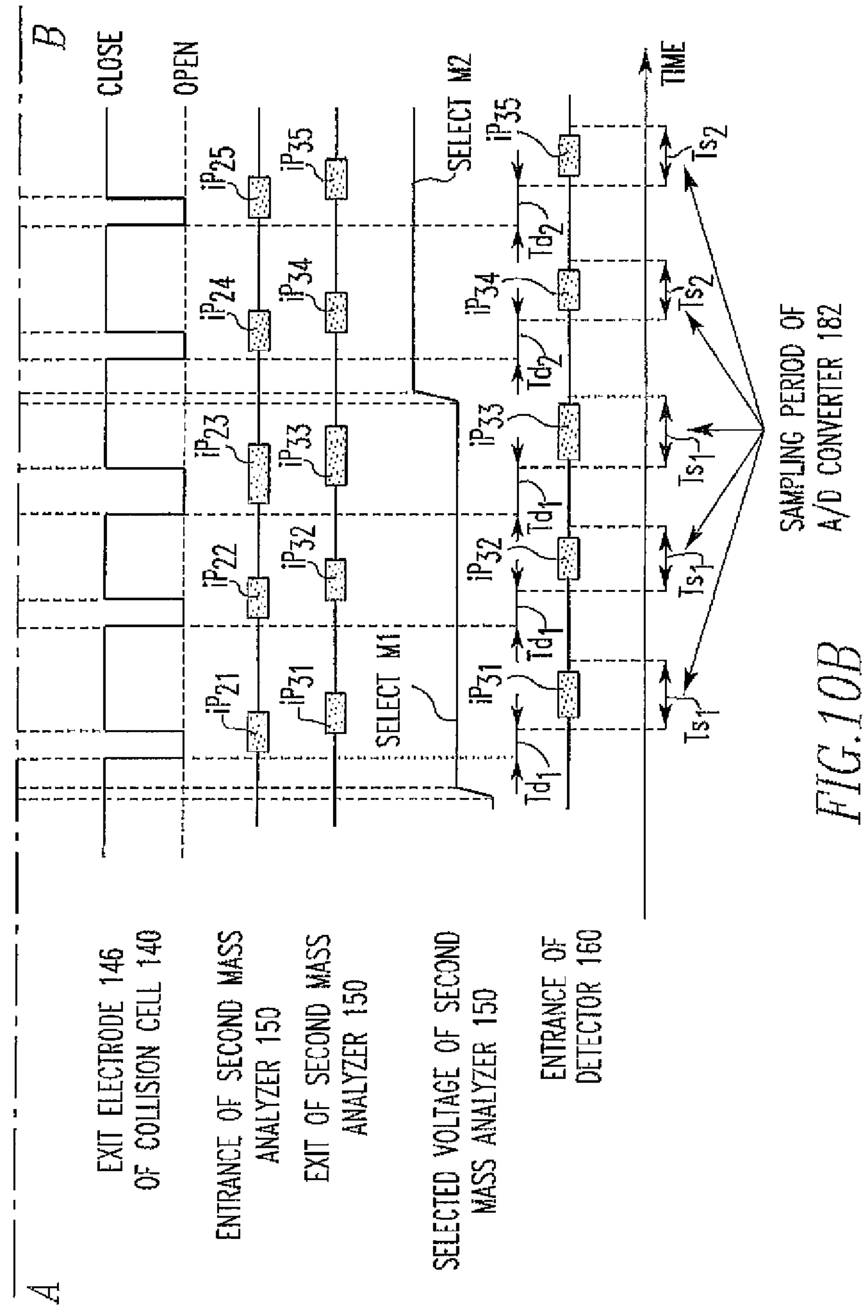

FIG. 10 is a timing chart illustrating one example of sequence of operations performed by the triple quadrupole mass spectrometer of this first modification. In the sequence illustrated in FIG. 10, process steps performed until the pulsed ions $ip_{31}$ to $ip_{35}$ enter the detector 160 are the same as the corresponding steps of FIG. 9 and so their description is omitted.

Where the pulsed ion $ip_{32}$, for example, is sampled by the A/D converter 182, the instant at which the sampling is started is between the instant at which sampling of the pulsed ion $ip_{31}$ incident on the detector 160 immediately therebefore ends and the instant at which the pulsed ion $ip_{32}$ begins to enter the detector 160. The instant of the end of sampling is between the instant at which the pulsed ion $ip_{32}$ finishes entering the detector 160 and the instant at which the pulsed ion $ip_{33}$ entering the detector 160 immediately thereafter is started to be sampled. By sampling pulsed ions by the A/D converter 182 during the time in which pulsed ions are entering the detector in this way, acceptance of unwanted noise is prevented. The detection sensitivity can be enhanced. As the time during which sampling is done by the A/D converter 182 agrees more closely with the time during which pulsed ions are detected by the detector 160, the signal-to-noise ratio is improved.

Ion intensities are obtained by accumulating or averaging digital signals by the data processing portion 184, the digital signals being created by sampling the pulsed ions $ip_{31}$, $ip_{32}$, and $ip_{33}$ by the A/D converter 182. The ion intensities are stored in the data storage portion 186 together with identification information about the transitions (different pairs of m/z values (M1) of ions selected by the first mass analyzer 130 and m/z values (M1) of ions selected by the second mass analyzer 150).

Where pulsed ions are sampled in this way, the instrument may be so set up that sampling is done during a desired time of operation after a given delay time from the instant at which the expelling operation of the collision cell 140 was started as shown in FIG. 10. For example, in the case of the pulsed ion $ip_{31}$, sampling is performed for the time of operation $Ts_1$ after the delay time $Td_1$ since the start time $t_a$ of the expelling operation of the collision cell 140 for expelling the pulsed ion $ip_{21}$ on which the pulsed ion $ip_{31}$ is based. With respect to sampling of other pulsed ions $ip_{32}$, $ip_{33}$, $ip_{34}$, and $ip_{35}$, delay times from the start instants $t_c$, $t_e$, $t_g$, and $t_i$ of expelling operations of the collision cell 140 expelling the pulsed ions $ip_{22}$, $ip_{23}$, $ip_{24}$, and $ip_{25}$ on which those pulsed ions are based and a time of operation for performing sampling are set.

Where the time in which the exit electrode 146 of the collision cell 140 is open is constant, pulsed ions of the same ion species selected by the second mass analyzer 150 have the same flight velocity and the same time width and so they can be sampled with the same delay time and for the same time of operation. For example, where two pulsed ions $ip_{31}$ and $ip_{32}$ with m/z of m1 selected by the second mass analyzer 150 are sampled, if opening times $t_b$-$t_a$ and $t_d$-$t_c$ for the operations for expelling the pulsed ions $ip_{21}$ and $ip_{22}$ are set to the same time, the delay times should be set to the same time $Td_1$. Also, the times of operation should be set to the same time $Ts_1$. On the other hand, the opening time $t_f$-$t_e$ for the operation for expelling the pulsed ion $ip_{23}$ is longer than the opening times $t_b$-$t_a$ and $t_d$-$t_c$ of the operation for expelling the pulsed ions $ip_{21}$ and $ip_{22}$ and, therefore, a time of operation $ts_1$' in which the pulsed ion $ip_{33}$ is sampled is set longer than $Ts_1$. The delay time for sampling of the pulsed ion $ip_{33}$ may be set equal to the delay time $Td_1$ for sampling of the pulsed ions $ip_{31}$ and $ip_{32}$.

When the ion selected by the second mass analyzer 150 is varied, the flight velocity and time width of pulsed ions expelled from the exit electrode 146 of the collision cell 140 are also varied. For example, the delay time $td_1$ relative to the pulsed ion $ip_{31}$ with ink of M1 selected by the second mass analyzer 150 is different from the delay time $td_2$ relative to the pulsed ion $ip_{34}$ with m/z of m2 selected by the second mass analyzer 150. The times of operation $Ts_1$ and $Ts_2$ are also different. That is, the delay time and time of operation are varied by the ion selected by the second mass analyzer 150.

Second Modification

The triple quadrupole mass spectrometer according to the third embodiment may be so modified that the ion source 114 for ionizing a sample in a vacuum is used instead of the atmospheric-pressure ion source 110, in the same way as modification 2 of the triple quadrupole mass analyzer 1C according to the second embodiment. Its configuration is similar to that shown in FIG. 8 and so its description and illustration are omitted.

It is to be understood that the present invention is not limited to the embodiments described so far and that the embodiments can be variously modified without departing from the gist and scope of the invention.

The present invention embraces configurations substantially identical (e.g., in function, method, and results or in purpose and advantageous effects) with the configurations described in the preferred embodiments of the invention. Furthermore, the invention embraces the configurations described in the embodiments including portions which have replaced non-essential portions. In addition, the invention embraces configurations which produce the same advantageous effects as those produced by the configurations described in the preferred embodiments or which can achieve the same objects as the objects of the configurations described in the preferred embodiments. Further, the invention embraces configurations which are the same as the configurations described in the preferred embodiments and to which well-known techniques have been added.

Having thus described my invention with the detail and particularity required by the Patent Laws, what is desired protected by Letters Patent is set forth in the following claims.

The invention claimed is:

1. A mass spectrometer for analyzing ions according to selected mass-to-charge ratios comprising:

an ion source for ionizing a sample;

an ion storage portion for repeatedly performing a storing operation for storing ions generated by the ion source and an expelling operation for repeatedly expelling the stored ions as pulsed ions;

a quadrupole mass filter for receiving the pulsed ions expelled by the ion storage portion and permitting only desired ions to pass having the selected mass-to-charge ratio defined by selected AC and DC voltages supplied to the quadrupole mass filter;

a detector for detecting the pulsed ions passed through the quadrupole mass filter and outputting an analog signal responsive to a detection intensity; and a controller for controlling said selected AC and DC voltages supplied to the quadrupole mass filter, said controller for maintaining said voltages constant while pulsed ions are passing through the quadrupole mass filter and repeatedly changing the selection voltages while pulsed ions are not being introduced in the quadrupole mass filter.

2. The mass spectrometer of claim 1, wherein said ion storage portion repeatedly performs the storing operation and the expelling operation at their respective regular intervals.

3. The mass spectrometer of any one of claim 1 or 2, further comprising an A/D converter for sampling the analog signal outputted from the detector and converting the signal into a digital signal, a data processing portion for accumulating or averaging the digital signal outputted from the A/D converter, and a data storage portion for storing output data produced from the data processing portion, wherein said data processing portion performs the accumulating or averaging operation for each mass-to-charge ratio of said desired ions, and wherein data derived by said accumulation or averaging are correlated with information about the mass-to-charge ratio of the desired ions and stored in said data storage portion.

4. The mass spectrometer of claim 3, wherein said A/D converter starts to sample said analog signal before each of pulsed ions passed through the mass analyzer impinges on the detector and ends the sampling of the analog signal after end of the impingement on the detector.

5. The mass spectrometer of claim 4, wherein said A/D converter begins to sample the analog signal after a given delay time since the ion storage portion started to perform the expelling operation for expelling each of pulsed ions of the same ion species selected by the mass analyzer.

6. The mass spectrometer of claim 4, wherein said A/D converter samples the analog signal for a given time after a given delay time since the ion storage portion started to perform the expelling operation for causing each of pulsed ions of the same ion species selected by the mass analyzer to be expelled for a given time.

7. A mass spectrometer for analyzing ions according to selected mass-to-charge ratios comprising:

an ion source for ionizing a sample;

an ion storage portion for repeatedly performing a storing operation for storing ions generated by the ion source and an expelling operation for repeatedly expelling the stored ions as pulsed ions;

a first quadrupole mass filter for passing the pulsed ions expelled by the ion storage portion and selecting first ions according to their mass-to-charge ratio;

a collision cell for fragmenting all or some of pulsed ions passed through the first mass analyzer to produce product ions and expelling pulsed ions including the product ions;

a second quadrupole mass filter for passing the pulsed ions expelled by the collision cell and selecting second ions according to their mass-to-charge ratio;

a detector for detecting the pulsed ions passed through the second mass analyzer and outputting an analog signal responsive to a detection intensity; and a controller controlling said selection voltages supplied to the first and second quadrupole mass filters, said controller maintaining said selection voltages for the first quadrupole mass filter constant while pulsed ions including the first ions are travelling in the first quadrupole mass filter, and maintaining said selection voltages for the second quadrupole mass filter constant while pulsed ions including the second ions are travelling in the second quadrupole mass filter, and repeatedly changing said selection voltages for the first and second quadrupole mass filters while ions are not being received into the first and second quadrupole mass filters.

8. The mass spectrometer of claim 7, wherein said ion storage portion repeatedly performs the storing operation and the expelling operation at their respective regular intervals.

9. The mass spectrometer of claim 7, wherein said collision cell repeatedly performs the storing operation for storing said first ions and the product ions and the expelling operation for expelling pulsed ions including the stored product ions.

10. The mass spectrometer of claim 9, wherein said ion storage portion repeatedly performs the storing operation and the expelling operation at their respective regular intervals.

11. The mass spectrometer of any one of claims 9 to 10, wherein said collision cell performs said storing operation while the pulsed ions passed through the first mass analyzer impinge on the collision cell.

12. The mass spectrometer of any one of claims 9 to 10, wherein when the mass-to-charge ratio of said first ions selected by said first mass analyzer is modified, said collision cell expels all of said second ions present in the collision cell by an expelling operation for expelling a pulsed ion occurring finally prior to the modification.

13. The mass spectrometer of any one of claims 7 to 10, further comprising an A/D converter for sampling said analog output signal from the detector and converting the signal into a digital signal, a data processing portion for accumulating or averaging a digital output signal from the A/D converter, and a data storage portion for storing output data produced from the data processing portion, wherein said data processing portion performs the accumulating or averaging operation for each transition (pair of the mass-to-charge ratio of the first ions and the mass-to-charge ratio of the second ions), and wherein data about results of said accumulation or averaging are correlated with information about pairs of the mass-to-charge ratios of the first and second ions and stored in said data storage portion.

14. The mass spectrometer of claim 13, wherein said A/D converter starts to sample said analog signal for each of pulsed ions passed through the second mass analyzer before the ions begin to impinge on the detector and ends the sampling of the analog signal after end of the impingement on the detector.

15. The mass spectrometer of claim 14, wherein when pulsed ions are expelled from said collision cell, said A/D converter begins to sample the analog signal after a given delay time since the collision cell started to perform the expelling operation for expelling each of pulsed ions of the same ion species selected by the second mass analyzer.

16. The mass spectrometer of claim 14, wherein when pulsed ions are expelled from said collision cell, said A/D converter samples the analog signal for a given time after a given delay time since the collision cell started to perform the expelling operation for expelling each of pulsed ions of the same ion species selected by the second mass analyzer.

17. The mass spectrometer of claim 14, wherein when pulsed ions are expelled only from said ion storage portion, said A/D converter begins to sample the analog signal after a given delay time since the ion storage portion started the expelling operation for expelling each of pulsed ions in the same transition (pair of m/z values).

18. The mass spectrometer of claim 14, wherein when pulsed ions are expelled only from said ion storage portion, said A/D converter samples the analog signal for a given time after a given delay time since the ion storage portion started the expelling operation for expelling each of pulsed ions in the same transition (pair of m/z values).

19. The mass spectrometer of any one of claims 7 to 10, wherein said first mass analyzer includes a quadrupole mass filter for selecting the first ions, and wherein said second mass analyzer includes a quadrupole mass filter for selecting the second ions.

* * * * *

UNITED STATES PATENT AND TRADEMARK OFFICE

CERTIFICATE OF CORRECTION

PATENT NO. : 8,604,420 B2
APPLICATION NO. : 13/115372
DATED : December 10, 2013
INVENTOR(S) : Kou It is certified that error appears in the above-identified patent and that said Letters Patent is hereby corrected as shown below:

In the Claims

Column 25, Lines 43-44, Claim 1, delete "controller for maintaining" and insert -- controller maintaining --

Column 25, Line 52, Claim 3, delete "claim 1 or 2" and insert -- claims 1 or 2 --

Signed and Sealed this
Twenty-ninth Day of April, 2014

Michelle K. Lee

Michelle K. Lee
*Deputy Director of the United States Patent and Trademark Office*